US011086470B2

(12) United States Patent
Suh

(10) Patent No.: US 11,086,470 B2
(45) Date of Patent: Aug. 10, 2021

(54) MOBILE TERMINAL PERFORMING METHOD OF PROVIDING BREWING INFORMATION OF BEER MAKER AND RECORDING MEDIUM RECORDING PROGRAM PERFORMING THE METHOD

(71) Applicant: LG Electronics Inc., Seoul (KR)

(72) Inventor: Mina Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/912,364

(22) Filed: Jun. 25, 2020

(65) Prior Publication Data

US 2020/0326818 A1    Oct. 15, 2020

Related U.S. Application Data

(63) Continuation of application No. 15/806,408, filed on Nov. 8, 2017, now Pat. No. 10,732,785.

(30) Foreign Application Priority Data

Nov. 10, 2016    (KR) .......................... 10-2016-0149573

(51) Int. Cl.
*G06F 3/048*        (2013.01)
*G06F 3/0481*       (2013.01)
(Continued)

(52) U.S. Cl.
CPC ............ *G06F 3/0481* (2013.01); *A47J 31/44* (2013.01); *C12C 13/10* (2013.01); *G07F 13/065* (2013.01);
(Continued)

(58) Field of Classification Search
CPC ............ G06F 3/0481; H04M 1/72412; H04M 1/72415; H04M 2250/06; H04M 2201/34;
(Continued)

(56) References Cited

U.S. PATENT DOCUMENTS

2011/0283888 A1    11/2011    Pozzari et al.
2012/0251661 A1    10/2012    Toombs
(Continued)

FOREIGN PATENT DOCUMENTS

CN        204111724        1/2015
JP        2001229466       8/2001
(Continued)

OTHER PUBLICATIONS

Extended European Search Report in European Application No. 17200798.1, dated Jan. 19, 2018, 8 pages.
(Continued)

*Primary Examiner* — Pei Yong Weng

(74) *Attorney, Agent, or Firm* — Fish & Richardson P.C.

(57) ABSTRACT

A mobile terminal includes: a wireless communication unit configured to communicate with a beverage-making apparatus; a display unit; and at least one processor. The at least one processor is configured to: receive, from the beverage-making apparatus, beverage-making information that is determined based on ingredient information of a beverage made by the beverage-making apparatus; display, through the display unit, a beverage-making interface that comprises the received beverage-making information; during a beverage-making process of the beverage by the beverage-making apparatus, receive beverage-making state information from the beverage-making apparatus; and update the beverage-making interface based on the received beverage-making state information.

11 Claims, 22 Drawing Sheets

(51) Int. Cl.
  *G07F 13/06*     (2006.01)
  *G07F 17/00*     (2006.01)
  *C12C 13/10*     (2006.01)
  *H04M 1/72412*   (2021.01)
  *A47J 31/44*     (2006.01)

(52) U.S. Cl.
  CPC .... *G07F 17/0064* (2013.01); *H04M 1/72412* (2021.01)

(58) Field of Classification Search
  CPC .............. H04M 2201/38; G07F 13/065; G07F 17/0064; C12C 13/10; A47J 31/44; G06Q 50/04; G06Q 50/12
  See application file for complete search history.

(56) References Cited

U.S. PATENT DOCUMENTS

| | | |
|---|---|---|
| 2015/0000530 A1 | 1/2015 | Mitchell |
| 2015/0305551 A1 | 10/2015 | Rosati et al. |
| 2016/0143474 A1 | 5/2016 | Wessels et al. |
| 2016/0201018 A1 | 7/2016 | Watson |
| 2016/0222334 A1 | 8/2016 | Yang et al. |
| 2016/0257554 A1 | 9/2016 | Manwani |

FOREIGN PATENT DOCUMENTS

| | | |
|---|---|---|
| KR | 101500981 | 3/2015 |
| KR | 1020160124508 | 10/2016 |

OTHER PUBLICATIONS

European Office Action in EP Appln. No. 17 200 798.1, dated Apr. 6, 2021, 11 pages.

MOBILE TERMINAL PERFORMING METHOD OF PROVIDING BREWING INFORMATION OF BEER MAKER AND RECORDING MEDIUM RECORDING PROGRAM PERFORMING THE METHOD

CROSS-REFERENCE TO RELATED APPLICATIONS

This application is a continuation application of U.S. application Ser. No. 15/806,408, filed on Nov. 8, 2017, which claims priority under 35 U.S.C. 119 and 365 to Korean Patent Application No. 10-2016-0149573, filed on Nov. 10, 2016, in the Korean Intellectual Property Office, the disclosures of which are incorporated herein by reference in their entirety.

TECHNICAL FIELD

The present disclosure generally relates to a mobile terminal, and more particularly, to a mobile terminal that is communicative with a beverage-making apparatus and provides information related to beverage-making operations of the beverage-making apparatus.

BACKGROUND

Various types of beverages are made via fermentation. Such beverages are typically made using ingredients that are combined and fermented to yield the resulting beverage. As an example, beer is an alcoholic beverage that is brewed by filtering wort, adding hops to the wort, and then fermenting the resulting wort mixture with yeast. Wort is typically made with malt, which is made from germinated barley.

Ingredients for brewing beer typically include water, malt, hops, yeast, flavor additives, and the like. The yeast is often referred to as leaven, and is typically added to malt to induce fermentation. The yeast may also facilitate the generation of alcohol and carbon dioxide (or carbonic acid). In some scenarios, flavor additives are added that improve the taste of beer, such as fruit, syrup, and vanilla bean additives.

SUMMARY

Implementations disclosed herein provide a mobile terminal configured to conveniently provide information regarding a beverage being made in a beverage-making apparatus.

In one aspect, a mobile terminal includes a wireless communication unit configured to communicate with a beverage-making apparatus; a display unit; and at least one processor. The at least one processor is configured to: receive, from the beverage-making apparatus, beverage-making information that is determined based on ingredient information of a beverage made by the beverage-making apparatus; display, through the display unit, a beverage-making interface that comprises the received beverage-making information; during a beverage-making process of the beverage by the beverage-making apparatus, receive beverage-making state information from the beverage-making apparatus; and update the beverage-making interface based on the received beverage-making state information.

In some implementations, the beverage-making process of the beverage comprises at least a first stage and a second stage, and the beverage-making information comprises at least one of: a beverage-making completion time of the beverage-making process, determined based on the ingredient information of the beverage, a first temperature for the first stage and a second temperature for the second stage of the beverage-making process, determined based on the ingredient information of the beverage, or an amount of carbonic acid generated during the beverage-making process, determined based on the ingredient information of the beverage.

In some implementations, the at least one processor is configured to display the beverage-making interface that comprises the received beverage-making information by: displaying the beverage-making interface to comprise at least one of the ingredient information, the beverage-making completion time, a beverage-making progress degree of the beverage being made, a temperature in a fermentation tank of the beverage-making apparatus, or the amount of carbonic acid generated during the beverage-making process.

In some implementations, the at least one processor is configured to display the beverage-making interface that comprises the received beverage-making information by: displaying, through the beverage-making interface, a first image representing a first state of the beverage being made in the beverage-making apparatus.

In some implementations, the at least one processor is configured to update the beverage-making interface based on the received beverage-making state information by: updating the beverage-making interface to display a second image, different from the first image, representing a second state of the beverage being made in the beverage-making apparatus, the second state being indicated in the beverage-making state information received from the beverage-making apparatus.

In some implementations, the first image comprises information regarding at least one of a color of the beverage being made or an amount of carbonic acid of the beverage being made, the color of the beverage being made is determined based on the ingredient information for the beverage, and the amount of carbonic acid of the beverage being made is determined based on a pressure sensed by a pressure sensor of the beverage-making apparatus and based on a temperature sensed by a temperature sensor of the beverage-making apparatus.

In some implementations, the at least one processor is configured to: based on the beverage-making process of the beverage being completed, receive a notification from the beverage-making apparatus; and based on the received notification, display, through the display unit, a beverage-keeping interface that displays beverage-keeping information regarding the beverage being kept in the beverage-making apparatus.

In some implementations, the beverage-keeping information for the beverage being kept in the beverage-making apparatus comprises at least one of a drinkable time of the beverage being kept in the beverage-making apparatus, a remaining amount of the beverage being kept in the beverage-making apparatus, a freshness degree of the beverage being kept in the beverage-making apparatus, a temperature of the beverage being kept in the beverage-making apparatus, or an amount of carbonic acid of the beverage being kept in the beverage-making apparatus.

In some implementations, the at least one processor is configured to: based on at least a portion of the beverage being extracted from the beverage-making apparatus, receive, from the beverage-making apparatus, information regarding an extraction amount or a remaining amount of the beverage being kept in the beverage-making apparatus; and update the beverage-keeping interface, based on the received information regarding the extraction amount or the remaining amount of the beverage being kept in the beverage-making apparatus.

In some implementations, the at least one processor is configured to: display, through the beverage-keeping interface, a first image regarding the beverage being kept in the beverage-making apparatus, the first image representing at least one of the remaining amount of the beverage being kept in the beverage-making apparatus, the amount of carbonic acid of the beverage being kept in the beverage-making apparatus, or the freshness degree of the beverage being kept in the beverage-making apparatus; and based on the beverage-keeping information being changed, update the beverage-keeping interface to display a second image, different from the first image, based on the changed beverage-keeping information.

In some implementations, the at least one processor is configured to display the beverage-making interface that comprises the received beverage-making information by: displaying, through the beverage-making interface, the beverage-making information comprising at least one of a beverage-making time of the beverage-making process, a temperature of the beverage-making process, or an amount of carbonic acid in the beverage-making process, determined based on the ingredient information of the beverage.

In another aspect, at least one non-transitory computer-readable recording medium is encoded with at least one computer program comprising instructions that, when executed, operate to cause a mobile terminal communicative with a beverage-making apparatus to perform operations comprising: connecting the mobile terminal to the beverage-making apparatus; receiving, from the beverage-making apparatus, beverage-making information that is determined based on ingredient information of a beverage made by the beverage-making apparatus; displaying, through a display unit of the mobile terminal, a beverage-making interface that comprises the received beverage-making information; during a beverage-making process of the beverage by the beverage-making apparatus, receiving beverage-making state information from the beverage-making apparatus; and updating the beverage-making interface based on the received beverage-making state information.

In some implementations, the beverage-making process of the beverage comprises at least a first stage and a second stage, and the beverage-making information comprises at least one of: a beverage-making completion time of the beverage-making process, determined based on the ingredient information of the beverage, a first temperature for the first stage and a second temperature for the second stage of the beverage-making process, determined based on the ingredient information of the beverage, or an amount of carbonic acid generated during the beverage-making process, determined based on the ingredient information.

In some implementations, displaying the beverage-making interface comprising the received beverage-making information comprises: displaying, through the beverage-making interface, a first image representing a first state of the beverage being made in the beverage-making apparatus.

In some implementations, updating the beverage-making interface based on the received beverage-making state information comprises: updating the beverage-making interface to display a second image, different from the first image, representing a second state of the beverage being made in the beverage-making apparatus, the second state being indicated in the beverage-making state information received from the beverage-making apparatus.

In some implementations, the operations further comprise: based on the beverage-making process of the beverage being completed, receiving a notification from the beverage-making apparatus; and based on the received notification, displaying, through the display unit, a beverage-keeping interface that displays beverage-keeping information regarding the beverage being kept in the beverage-making apparatus.

In some implementations, the operations further comprise: based on at least a portion of the beverage being extracted from the beverage-making apparatus, receiving, from the beverage-making apparatus, information regarding an extraction amount or a remaining amount of the beverage being kept in the beverage-making apparatus; and updating the beverage-keeping interface, based on the received information regarding the extraction amount or the remaining amount of the beverage being kept in the beverage-making apparatus.

In another aspect, a mobile terminal includes: a wireless communication unit configured to communicate with a beverage-making apparatus; a display unit; and at least one processor. The at least one processor is configured to: acquire, through a user input unit, ingredient information of a beverage; transmit the acquired ingredient information to the beverage-making apparatus; display, through the display unit, a beverage-making interface that comprises beverage-making information that is generated based on the acquired ingredient information; during a beverage-making process of the beverage by the beverage-making apparatus, receive beverage-making state information from the beverage-making apparatus; and update the beverage-making interface, based on the received beverage-making state information.

In some implementations, the beverage-making information is generated by the beverage-making apparatus and is received through the wireless communication unit of the mobile terminal.

In some implementations, the at least one processor is configured to: based on the beverage-making process of the beverage being completed, receive a notification from the beverage-making apparatus; and based on the received notification, display, through the display unit, a beverage-keeping interface that displays beverage-keeping information regarding the beverage being kept in the beverage-making apparatus.

Further scope of applicability of the present disclosure will become apparent from the detailed description given hereinafter. However, it should be understood that the detailed description and specific examples are given by way of illustration only, and that various changes and modifications within the spirit and scope of the disclosure may be made.

DETAILED DESCRIPTION

In some scenarios, when a user makes a beverage using a beverage-making apparatus, such as a beer-maker, the user may have difficulty in accurately detecting a state of the beverage-making process in the beverage-making apparatus. In addition, when the completed beverage is kept in the beverage-making apparatus, the user may have difficulty in detecting a state of the beverage being kept in the beverage-making apparatus.

Implementations disclosed herein provide a mobile terminal configured to conveniently provide information regarding a beverage being made in a beverage-making apparatus. In some implementations, the mobile terminal provides various types of information related to a state of a beverage being kept in the beverage-making apparatus.

As an example, the mobile terminal displays a beverage-making interface including beverage-making information received from the beverage-making apparatus, and updates the beverage-making interface according to beverage-making state information received during making of the beverage. Accordingly, a user can conveniently check a state of the beverage-making process, based on the beverage-making interface displayed through the mobile terminal.

In some implementations, when a beverage-making process has been completed and a beverage is kept in the beverage-making apparatus, the mobile terminal displays a beverage-keeping screen representing a state of the beverage being kept in the beverage-making apparatus, so that various types of information related to the state of the beverage kept in the beverage-making apparatus can be effectively provided to the user.

One example of a beverage-making apparatus is a beer-maker, which may be used in homes. Typically, a beverage-making process for beer may include a total of three steps, i.e., a wort producing step, a fermenting step, and a ripening step, and two weeks to three weeks may be required from the wort producing step to the ripening step. In some scenarios, a beverage-making apparatus can be configured to conveniently regulate a temperature for beer fermentation.

Hereinafter, exemplary implementations of the present disclosure will be described in detail with reference to the accompanying drawings.

Some of the examples below describe a scenario in which the beverage-making apparatus is specifically a beer-making apparatus. However, implementations are not limited thereto, and may be implemented as any suitable beverage making apparatus that utilizes fermentation.

Figure 1:
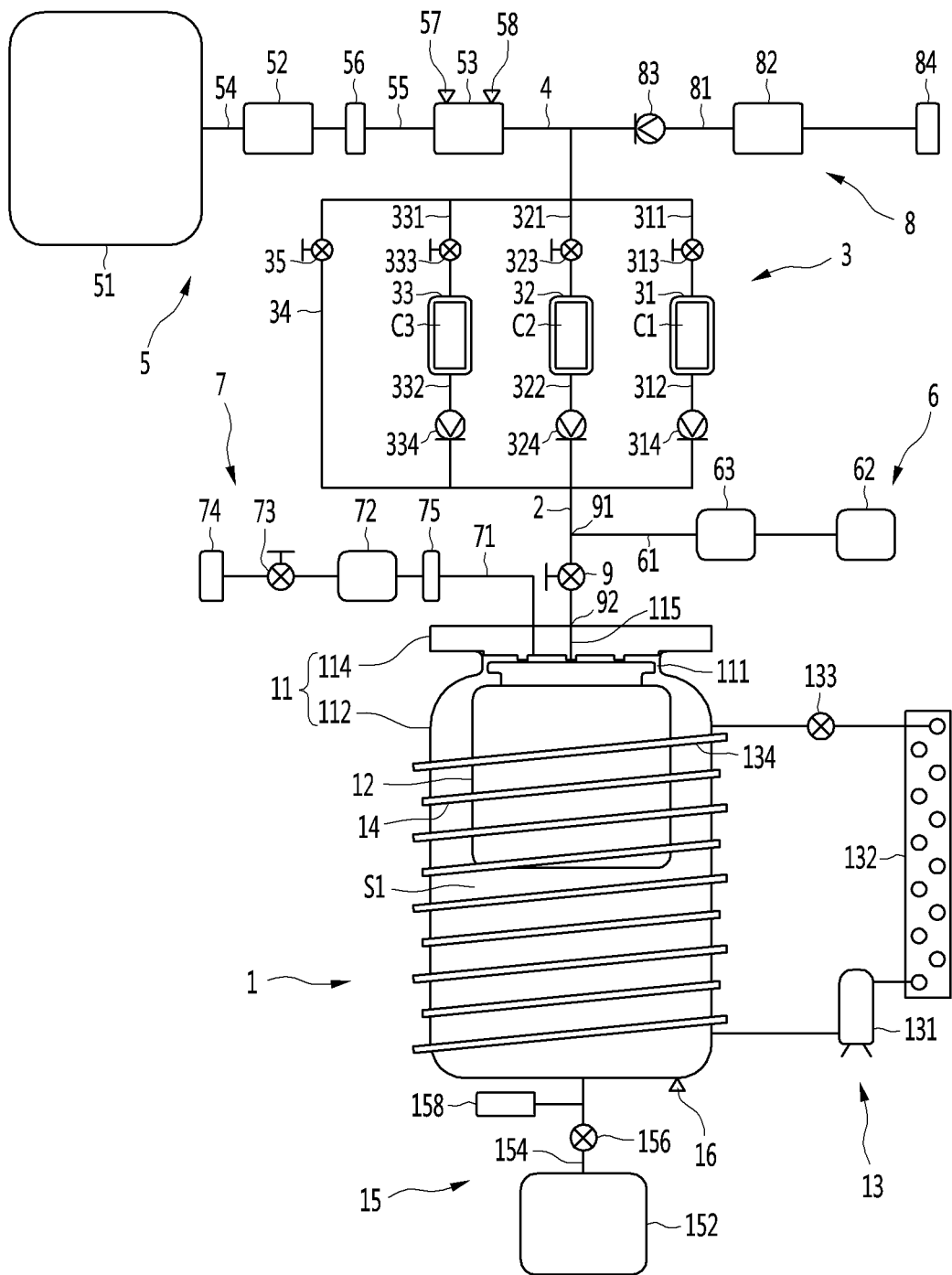
FIG. 1 is a diagram illustrating an example of an entire configuration view of a beverage-making apparatus according to some implementations.

FIG. 1 is an entire configuration view of a beverage maker according to an implementation.

The beverage making apparatus, as shown in FIG. 1, may include a fermentation module 1, an ingredient supplier 3 (or simply, supplier 3) connected to the fermentation module 1 through a main channel 2 (also referred to as main flow path 2), a water supply module 5 connected to the supplier 3 through a water supply channel 4 (also referred to as water supply flow path 4), and a beverage extractor 6 that allows a beverage fermented in the fermentation module 1 to be extracted to the outside.

The fermentation module 1 includes a container, for example fermentation tank assembly 11, having a space S1 formed therein. The container may include a container body, such as fermentation tank 112, and a container cover, such as fermentation tank cover 114.

In the example of FIG. 1, the fermentation tank assembly 11 includes a fermentation tank 112 has an opening 111 formed at an upper portion thereof, the fermentation tank 112 having the space S1 formed therein, and a fermentation tank cover 114 covering the opening 111.

The fermentation tank 112 may be configured as an assembly of a plurality of members.

The fermentation tank cover 114 is used to seal the inside of the fermentation tank 112, and may be disposed at an upper portion of the fermentation tank 112 to cover the opening 111. A main flow path connecting part 115 connected to the main flow path 2 may be formed in the fermentation tank cover 114.

In addition, the fermentation module 1 may further include a removable beverage ingredient pack 12 that holds at least some of the ingredients for making the beverage. As shown in the example of FIG. 1, the beverage ingredient pack 12 may be a beverage ingredient pack that is inserted and accommodated in the fermentation tank assembly 11.

In this example, the beverage ingredient pack 12 may be a pack in which ingredients for brewing a beverage are accommodated. The following description will focus on the scenario of a beverage brewing pack 12 as the beverage ingredient pack, although implementations may be applied to any suitable beverage ingredient pack utilized for fermentation.

The beverage brewing pack 12 may be formed smaller than the space S1 formed in the fermentation tank assembly 11. The beverage brewing pack 12 may be inserted and accommodated in the fermentation tank assembly 11 in a state in which the ingredients are accommodated therein. The beverage brewing pack may be inserted into the fermentation tank 112 to be accommodated in the fermentation tank 112 in a state in which the opening 111 of the fermentation tank 112 is opened. The fermentation tank cover 114 may cover the opening 111 of the fermentation tank 112 after the beverage brewing pack 12 is inserted into the fermentation tank 112. The beverage brewing pack 12 may assist the ingredients to be fermented in a state in which the beverage brewing pack 12 is accommodated in the space S1 sealed by the fermentation tank 112 and the fermentation tank cover 114. The beverage brewing pack 12 may be expanded by a pressure therein while the beverage is being brewed.

As an example, in the case where the beverage is beer, the ingredients for brewing the beer may include water, malt, yeast, hops, flavor additives, and the like.

The beverage maker may include both of the supplier 3 and the beverage ingredient pack 12, and the ingredients for brewing the beverage may be distributed and accommodated in the supplier 3 and the beverage ingredient pack 12. Some ingredients among the ingredients for brewing the beverage may be accommodated in the beverage ingredient pack 12, and the other ingredients may be accommodated in the supplier 3. The other ingredients accommodated in the supplier 3 may be supplied to the beverage ingredient pack 12 together with water supplied from the water supply module 5, and be mixed with the ingredients accommodated in the beverage ingredient pack 12.

A main ingredient essential to brew the beverage may be accommodated in the beverage ingredient pack 12, and additives added to the main ingredient may be accommodated in the supplier 3. In this case, the additives accommodated in the supplier 3 may be mixed with the water supplied from the water supply module 5 to be supplied to the beverage ingredient pack 12, and be mixed with the main ingredient accommodated in the beverage ingredient pack 12.

The main ingredient accommodated in the beverage ingredient pack 12 is an ingredient having a larger volume than the other ingredients, and may be, in the case of beer, the malt among the malt, the yeast, the hops, and the flavor additives. In addition, the additives accommodated in the supplier 3 may be the other ingredients except the malt among the ingredient for brewing the beer, and be the yeast, the hops, the flavor additives, and the like.

In some implementations, the beverage maker does not include both of the beverage ingredient pack 12 and the supplier 3 as described above, but may include only the supplier 3 without any separate beverage ingredient pack 12. All of the ingredients for brewing the beverage may be accommodated in the supplier 3. In this case, all of the ingredients accommodated in the supplier 3 may be supplied to the inside of the fermentation tank assembly 11 together with the water supplied from the water supply module 5. The main ingredient and the additives may be accommodated together in the supplier 3. The main ingredient and additives, which are accommodated in the supplier 3, may be simultaneously supplied to the inside of the fermentation tank assembly 11 or be sequentially supplied with a time difference.

In addition, the beverage maker does not include any separate beverage ingredient pack 12, but may directly inject some ingredients among the ingredients for brewing the beverage into the fermentation tank assembly 11 and allow the other ingredients for brewing the beverage to be accommodated in the supplier 3. In this case, a user may directly inject the main ingredient into the fermentation tank assembly 11, and the additives may be accommodated in the supplier 3. The additives accommodated in the supplier 3 may be mixed with the water supplied from the water supply module 5, and be mixed with the main ingredient previously injected into the fermentation tank assembly 11.

In addition, the beverage maker does not include the supplier 3, but may include the beverage ingredient pack 12. In this case, the main ingredient may be accommodated in the beverage ingredient pack 12, and the user may directly inject the additives into the beverage ingredient pack 12.

In addition, the beverage maker does not include both of the supplier 3 and the beverage ingredient pack 12, but the user may directly inject the main ingredient and the additives simultaneously or with a time difference into the fermentation tank assembly 11.

When the beverage maker includes both of the supplier 3 and the beverage ingredient pack 12, the beverage can be more conveniently brewed. Hereinafter, the case where the beverage maker includes both of the supplier 3 and the beverage ingredient pack 12 is described as an example. However, it will be apparent that the present disclosure is not limited to the case where the beverage maker includes both of the supplier 3 and the beverage ingredient pack 12.

The ingredients injected into the beverage ingredient pack 12 may be fermented as time elapses. The beverage that has been completely brewed in the beverage ingredient pack 12 may flow in the main flow path 2 through the main flow path connecting part 115, and flow from the main flow path 2 to the beverage extractor 6 to be extracted from the beverage extractor 6.

The fermentation module 1 may further include a temperature controller that changes a temperature of the fermentation tank assembly 11. As the temperature controller heats or cools the fermentation tank assembly 11, the temperature of the fermentation tank assembly 11 can be controlled to an optimum temperature for brewing the beverage.

The temperature controller may include a refrigeration cycle apparatus 13 including a compressor 131, a condenser 132, an expansion device 133, and an evaporator 134, and any one of the condenser 132 and the evaporator 134 may be disposed at the fermentation tank assembly 11.

When the condenser 132 is disposed in contact with the fermentation tank 112, the refrigeration cycle apparatus 13 may control a temperature of the fermentation tank 112 by heating the fermentation tank 112. In this case, the condenser 132 may be disposed in contact with the outer surface of the fermentation tank 112. The condenser 132 may include a condensing tube wound around the outer surface of the fermentation tank 112.

When the evaporator 134 is disposed in contact with the fermentation tank 112, the refrigeration cycle apparatus 13 may control the temperature of the fermentation tank 112 by cooling the fermentation tank 112. In this case, the evaporator 134 may be disposed in contact with the outer surface of the fermentation tank 112. The evaporator 134 may include an evaporating tube wound around the outer surface of the fermentation tank 112. The evaporating tube may be accommodated between the fermentation tank 112 and a heat insulating wall 102 (see FIGS. 3 and 4), and cool the inside of a heat insulating space S2 heat-insulated by the heat insulating wall 102.

The temperature controller may further include a heater 14 that heats the fermentation tank assembly 11. The heater 14 may be disposed in contact with the outer surface of the fermentation tank 112, and be configured as a heater that generates heat when power is applied thereto. The heater 14 may be configured as a line heater, and be wound around the outer surface of the fermentation tank 112.

The refrigeration cycle apparatus 13 may be configured as a heat pump. The refrigeration cycle apparatus 13 may include a flow path switching valve. The flow path switching valve may be configured as a four-way valve. The flow path switching valve may be connected to each of an inlet flow path of the compressor 131 and an outlet flow path of the compressor 131. The flow path switching valve may be connected to the condenser 132 through a condenser connection flow path, and be connected to the evaporator 134 through an evaporator connection flow path.

When the fermentation tank 112 is cooled, the flow path switching valve may guide a refrigerant compressed by the compressor 131 to the condenser 132 and guide the refrigerant discharged from the evaporator 134 to the compressor 131.

When the fermentation tank 112 is heated, the flow path switching valve may guide the refrigerant compressed by the compressor 131 to the evaporator 134 and guide the refrigerant discharged from the condenser 132 to the compressor 131.

The beverage maker may include a beverage extraction pressurizing device 15 that injects air between the beverage ingredient pack 12 and the fermentation tank assembly 11. In a state in which the beverage ingredient pack 12 is accommodated in the fermentation tank assembly 11, the beverage extraction pressurizing device 15 may inject air between the beverage ingredient pack 12 and the fermentation tank assembly 11, and the air injected into the fermentation tank assembly 11 may pressurize the beverage ingredient pack 12. The beverage in the beverage ingredient pack 12 may be pressurized by the air, and flow in the main flow path 2 by passing through the main flow path connecting part 115. The beverage flowing in the main flow path 2 from the beverage ingredient pack 12 may be extracted to the outside through the beverage extractor 6.

That is, in the beverage maker, if the beverage is completely brewed, the beverage in the beverage ingredient pack 12 may be extracted through the beverage extractor 6 in a state in which the beverage ingredient pack 12 is not taken out of the fermentation tank assembly 11 but located in the fermentation tank assembly 11.

The beverage extraction pressurizing device 15 may include an air pump 152 that pumps air and an air supply flow path 154 that connects the air pump 152 and the inside of the fermentation tank assembly 11. The beverage extraction pressurizing device 15 may further include an air control valve 156 installed in the air supply flow path 154. The beverage extraction pressurizing device 15 may further include an air relief valve 158 provided to the air supply flow path 154. The air relief valve 158 may be installed posterior to the air control valve 156 in an air supply direction in the air supply flow path 154.

The air control valve 156 may be opened only when the beverage is extracted to allow air to be introduced into the fermentation tank assembly 11, and maintain a closed state while the beverage is not being extracted.

The beverage maker may further include a temperature sensor 16 that measures a temperature of the fermentation tank assembly 11. The temperature sensor 16 may be installed to measure a temperature of the fermentation tank 112.

Hereinafter, the supplier 3 will be described as follows.

The supplier 3 may be connected to a water supply heater 53 through the water supply flow path 4, and be connected to the fermentation tank assembly 11 through the main flow path 2.

The supplier 3 may accommodate ingredients required to brew the beverage therein, and be configured to allow water supplied from the water supply module 5 to pass therethrough. For example, in the case of beer, the ingredients accommodated in the supplier 3 may be yeast, hops, flavor additives, and the like.

The ingredients accommodated in the supplier 3 may be directly accommodated in an ingredient accommodation part formed in the supplier 3. At least one ingredient accommodation part may be formed in the supplier 3. A plurality of ingredient accommodation parts may be formed in the supplier 3. In this case, the plurality of ingredient accommodation parts may be formed to be divided from one another.

In some implementations, the ingredients accommodated in the supplier 3 may be accommodated in a capsule, and at least one capsule accommodation part in which the capsule is accommodated may be formed in the supplier 3. When the ingredients are accommodated in the capsule, the supplier 3 may be configured such that the capsule is mountable and extractable. The supplier 3 may be configured as a capsule kit assembly in which the capsule is separably accommodated.

Each of the main flow path 2 and the water supply flow path 4 may be connected to the supplier 3. The water supplied through the water supply flow path 4 may be mixed with the ingredients by passing through the ingredient accommodation part or the capsule. The ingredients accommodated in the ingredient accommodation part or the capsule may flow in the main flow path 2 together with the water.

A plurality of different kinds of additives may be separated from one another to be accommodated in the supplier 3. The plurality of additives accommodated in the supplier 3 may be yeast, hops, and flavor additives, and be separated from one another to be accommodated in the supplier 3.

When a plurality of ingredient accommodation parts are formed in the supplier 3, each of the plurality of ingredient accommodation parts may be connected to the water supply flow path through a supplier entrance flow path, and be connected to the main flow path 2 through a supplier exit flow path.

When a plurality of capsule accommodation parts are formed in the supplier 3, each of the plurality of capsule accommodation parts may be connected to the water supply flow path 4 through the supplier entrance flow path, and be connected to the main flow path 2 through the supplier exit flow path.

The ingredient accommodation part of the supplier 3 and the capsule accommodation part of the supplier 3 may be the substantially same component. When the capsule is inserted into the supplier 3 in a state in which the ingredients are accommodated in the capsule, the component may be referred to as the capsule accommodation part. When the ingredients are directly accommodated in the supplier 3 in a state in which the ingredients are not contained in the capsule, the component may be referred to as the ingredient accommodation part. Since the ingredient accommodation part and the capsule accommodation part may be the substantially same component, it will be described below that, for convenience of description, the capsule accommodation part is formed in the supplier 3.

The capsule accommodation part in which a capsule containing additives is attachably/detachably accommodated may be formed in the supplier 3. The supplier 3 may be connected to the water supply flow path 4 through the supplier entrance flow path, and be connected to the main flow path 2 through the supplier exit flow path.

An opening/closing valve that opens/closes the supplier entrance flow path may be installed in the supplier entrance flow path.

A check valve that blocks a fluid of the main flow path 2 from flowing backward to the capsule accommodation part may be installed in the supplier exit flow path.

A plurality of capsule accommodation parts 31, 32, and 33 may be formed in the supplier 3. The plurality of capsule accommodation parts 31, 32, and 33 may be formed to be divided from one another. The plurality of capsule accommodation parts 31, 32, and 33 may be connected to supplier entrance flow paths and supplier exit flow paths, respectively.

Hereinafter, a first additive, a second additive, and a third additive may be accommodated in the supplier 3. The first additive may be yeast, the second additive may be hop, and the third additive may be a flavor additive.

The supplier 3 may include a first capsule accommodation part 31 in which a first capsule C1 containing the first additive is accommodated, a second capsule accommodation part 32 in which a second capsule C2 containing the second additive is accommodated, and a third capsule accommodation part 33 in which a third capsule C3 containing the third additive is accommodated.

A first supplier entrance flow path 311 that guides water or air to the first capsule accommodation part 31 may be connected to the first capsule accommodation part 31, and a first supplier exit flow path 312 through which water discharged from the first capsule accommodation part 31, a mixture of the water and the first additive, and air are guided may be connected to the first capsule accommodation part 31. A first opening/closing valve 313 that opens/closes the first supplier entrance flow path 311 may be installed in the first supplier entrance flow path 311. A first check valve 314 that blocks the fluid of the main flow path 2 from flowing backward to the first capsule accommodation part 31 while allowing a fluid of the first capsule accommodation part 31 to flow in the main flow path 2 may be installed in the first supplier exit flow path 312. Here, the fluid may include the water discharged from the first capsule accommodation part 31, the mixture of the water and the first additive, and the air.

A second supplier entrance flow path 321 that guides water or air to the second capsule accommodation part 32 may be connected to the second capsule accommodation part 32, and a second supplier exit flow path 322 through which water discharged from the second capsule accommodation part 32, a mixture of the water and the second additive, and air are guided may be connected to the second capsule accommodation part 32. A second opening/closing valve 323 that opens/closes the second supplier entrance flow path 321 may be installed in the second supplier entrance flow path 321. A second check valve 324 that blocks the fluid of the main flow path 2 from flowing backward to the second capsule accommodation part 32 while allowing a fluid of the second capsule accommodation part 32 to flow in the main flow path 2 may be installed in the second supplier exit flow path 322. Here, the fluid may include the water discharged from the second capsule accommodation part 32, the mixture of the water and the second additive, and the air.

A third supplier entrance flow path 331 that guides water or air to the third capsule accommodation part 33 may be connected to the third capsule accommodation part 33, and a third supplier exit flow path 332 through which water discharged from the third capsule accommodation part 33, a mixture of the water and the third additive, and air are guided may be connected to the third capsule accommodation part 33. A third opening/closing valve 323 that opens/closes the third supplier entrance flow path 331 may be installed in the third supplier entrance flow path 331. A third check valve 334 that blocks the fluid of the main flow path 2 from flowing backward to the third capsule accommodation part 33 while allowing a fluid of the third capsule accommodation part 33 to flow in the main flow path 2 may be installed in the third supplier exit flow path 332. Here, the fluid may include the water discharged from the third capsule accommodation part 33, the mixture of the water and the third additive, and the air.

The beverage maker may include a bypass flow path 34 that enables the water supplied from the water flow path 4 to be supplied to the main flow path 2 by bypassing the capsule accommodation parts 31, 32, and 33.

The bypass flow path 34 may be connected to the water supply flow path 4 and the main flow path 2, and water or air of the water flow path 4 may be guided to the bypass flow path 34 to flow in the main flow path 2 by bypassing the capsule accommodation parts 31, 32, and 33.

The bypass flow path 34 may be connected in parallel to flow paths of the first capsule accommodation part 31, the second capsule accommodation part 32, and the third capsule accommodation part 33.

A bypass valve 35 that opens/closes the bypass flow path 34 may be installed in the bypass flow path 34.

The beverage maker may include a main supply flow path that guides the water, the ingredients of the beverage, or the air to the fermentation tank assembly 11 therethrough.

When the beverage maker includes both of the supplier 3 and the water supply module 5, the main supply flow path may include all of the main flow path 2, the bypass flow path 34, and the water supply flow path 4. In this case, the main supply flow path may supply all of the water, the air, and the ingredients of the beverage to the fermentation tank assembly 11.

The beverage maker includes the supplier 3, but may not include the water supply module 5. In this case, the main supply flow path may include all of the main flow path 2, the bypass flow path 34, and the water supply flow path 4. The water supply flow path 4 may be directly connected to a water faucet or include a water supply tube that is connected to the water faucet through a separate connection hose to be supplied with external water. The water supply tube may be supplied with external water to supply the external water to the bypass flow path 34 or the supplier 3. That is, the main supply flow path may supply all of the water, the air, and the ingredients of the beverage to the fermentation tank assembly 11 therethrough.

The beverage maker includes the water supply module 5, but may not include the supplier 3. In this case, the main supply flow path may include the main flow path 2, and the main flow path 2 may be directly connected to the water supply module 5. In addition, an air injection flow path 81 of an air injector 8 may be connected to the main flow path 2.

When the beverage maker includes the water supply module 5 but does not include the supplier 3, the main supply flow path does not require a separate water supply flow path 4 or bypass flow path 34 that connects the water supply module 5 and the supplier 3, and the main flow path 2 may be directly supplied from the water supply module 5. In addition, the air injection flow path 81 of the air injector

8 may be connected to a portion located between the water supply module 5 and a main valve 9 in the main flow path 2.

When the beverage maker includes the water supply module 5 but does not include the supplier 3, water of the water supply module 5 may be supplied to the fermentation tank assembly 11 through the main flow path 2, and air of the air injector 8 may be supplied to the fermentation tank assembly 11 through the main flow path 2. That is, the main flow path may supply water and air to the fermentation tank assembly 11.

The beverage maker may not include both of the supplier 3 and the water supply module 5. In this case, the main supply flow path may include the main flow path 2, and the main flow path 2 may be directly connected to a water faucet or include a water supply tube that is connected to the water faucet through a separate connection hose to be supplied with external water. The water supply tube may be supplied with external water to supply the external water to the fermentation tank assembly 11.

When the beverage maker does not include both of the supplier 3 and the water supply module 5, the main supply flow path does not require a separate water supply flow path 4 or bypass flow path 34 that connects the water supply module 5 and the supplier 3, and the main flow path 2 may be directly supplied from the water supply module 5. In this case, the air injection flow path 81 of the air injector 8 may be connected to the main flow path 2, and be connected prior to the main valve 9 in the main flow path 2. That is, the main supply flow path may supply water and air to the fermentation tank assembly 11.

Hereinafter, the case where the beverage maker includes all of the main flow path 2, the water supply flow path 4, and the bypass flow path 34 will be described as an example.

The main flow path 2 may be connected to the first supplier exit flow path 312, the second supplier exit flow path 322, the third supplier exit flow path 332, and the bypass flow path 34. The main flow path 2 may include a common tube connected to the fermentation tank assembly 11 and a combination tube connected to the first supplier exit flow path 312, the second supplier exit flow path 322, the third supplier exit flow path 332, the bypass flow path 34 and the common tube.

The main flow path 2 may be connected to the fermentation tank assembly 11, and be connected to the fermentation tank cover 114 in the fermentation tank assembly 11.

The water supply flow path 4 may be connected to the first supplier entrance flow path 311, the second supplier entrance flow path 321, the third supplier entrance flow path 331, and the bypass flow path 34.

The water supply flow path 4 may include a common tube connected to the water supply module 5, and a plurality of branch tubes branching off from the common tube, the plurality of branch tubes being connected to the first supplier entrance flow path 311, the second supplier entrance flow path 321, the third supplier entrance flow path 331, and the bypass flow path 34.

The water supply module 5 may include a water tank 51 containing water, a water supply pump 52 that pumps the water of the water tank 51, and the water supply heater 53 that heats the water pumped by the water supply pump 52.

A water tank outlet flow path 54 may be connected to the water tank 51, and the water supply pump 52 may be connected to the water tank outlet flow path 54.

A water supply pump outlet flow path 55 may be connected to the water supply pump 52, and the water supply heater 53 may be connected to the water supply pump outlet flow path 55.

A flow meter 56 that measures a flow rate of the water supply pump outlet flow path 55 may be installed in the water supply pump outlet flow path 55.

The water supply heater 53 may be a mold heater, and include a heater case through which the water pumped by the water supply pump 52 passes, and a heater installed in the heater case to heat water introduced into the heater case. A thermistor 57 that measures a temperature of the water supply heater 53 may be installed in the water supply heater 53. In addition, a thermal fuse 58 that cuts off current applied to the water supply heater 53 as a circuit is interrupted when the temperature of the water supply heater 53 is high.

When the water supply pump 52 is driven, water of the water tank 51 may be guided to the water supply heater 53 through the water tank outlet flow path 54, the water supply pump 52, and the water supply pump outlet flow path 55. The water guided to the water heater 53 may be heated by the water supply heater 53 and then guided to the water supply flow path 4.

The beverage extractor 6 may be connected to the main flow path 2. The beverage extractor 6 may include a beverage extraction flow path 61 connected to the main flow path 2, the beverage extraction flow path 61 allowing the beverage of the main flow path 2 to be guided therethrough. The beverage extractor 6 may further include a beverage extraction valve 62 connected to the beverage extraction flow path 61.

An anti-foaming path 63 may be provided in the beverage extraction flow path 61, and foam of the beverage flowing from the main flow path 2 to the beverage extraction flow path 61 may be minimized by passing through the anti-foaming path 63. A mesh, etc., through which foam is filtered, may be provided in the anti-foaming path 63.

The beverage extraction valve 62 may include a lever manipulated by the user and a tap valve having a micro switch that detects a manipulation of the user.

In some implementations, the beverage maker may further include a gas discharger that discharges gas in the fermentation module 1 to the outside.

The gas discharger 7 may include a gas extraction flow path 71 connected to the fermentation module 1 and a pressure sensor 72 installed in the gas extraction flow path 71. The gas discharger 7 may further include a gas extraction valve 73 that opens/closes the gas extraction flow path 71. The gas discharger 7 may further include an air filter 74 through which gas passing through the gas extraction valve 73 passes.

The gas extraction flow path 71 may be connected to the fermentation tank assembly 11, particularly, the fermentation tank cover 114.

The gas extraction valve 73 may be turned on when air is injected into the beverage ingredient pack 12, to be opened. The beverage maker may allow malt and water to be uniformly mixed together by injecting air into the beverage ingredient pack 12. As such, in the case of beer making, bubbles generated from the liquid malt may be discharged to the outside at an upper portion of the beer brewing pack 12 through the gas extraction flow path 71 and the gas extraction valve 73.

The gas extraction valve 73 may be opened to detect a fermentation degree during a fermentation process. The gas in the beverage brewing pack 12 may flow in the pressure sensor 72. The pressure sensor 72 may sense a pressure of the gas discharged from the beverage brewing pack 12.

The pressure sensor 72, the gas extraction valve 73, and the air filter 74 may be sequentially disposed in a gas discharge direction in the gas extraction flow path 71.

The gas discharger 7 may further include a gas discharge relief valve 75 provided in the gas extraction flow path 71. The gas discharge relief valve 75 may be installed prior to the pressure sensor 72 in the gas discharge direction.

The beverage maker may further include the air injector 8 connected to at least one of the main flow path 2 and the water supply flow path 4 to inject air.

When the air injector 8 is connected to the water supply flow path 4, air may be injected into the supplier 3 through the water supply flow path 4. The air injected into the water supply flow path 4 may sequentially pass through the supplier 3 and the main flow path 2 and then be injected into the beverage brewing pack 12. When the air injector 8 is connected to the water supply flow path 4, air may be injected into the beverage brewing pack 12 through the water supply flow path 4, the bypass flow path 34, and the main flow path 2. The air injector 8 may supply the air to the ingredients in the beverage brewing pack 12.

When the air injector 8 is connected to the water supply flow path 4, air may be injected into the capsule accommodation parts 31, 32, and 33 through the water supply flow path 4, remaining water or sludge in the capsules C1, C2, and C3 and the capsule accommodation parts 31, 32, and 32 may flow in the main flow path 2, and the capsules C1, C2, and C3 and the capsule accommodation parts 31, 32, and 32 may be cleanly maintained.

The air injector 8 may include the air injection flow path 81 connected to the water supply flow path 4 and an air injection pump 82 that pumps air to the air injection flow path 81.

The air injector 8 may further include a check valve 83 that blocks the water of the water supply flow path 4 from being introduced into the air injection pump 82 through the air injection flow path 81. The check valve 83 may be installed posterior to the air injection pump 82 in an air injection direction.

The air injector 8 may further include an air filter 84 connected to the air injection flow path 81, the air filter 84 being installed prior to the air injection pump 82 in the air injection direction.

When the air injection pump 82 is driven, dust, etc. in air may be filtered by the air filter 84, and the air passing through the air filter 84 may be flowed by the air injection pump 82 to flow in the water supply flow path 4.

The beverage maker may further include the main valve 9 that opens/closes the main flow path 2.

The main valve 9 may be installed, in the main flow path 2, between a connection part 91 of the main flow path 2 and the beverage extraction flow path 61 and a connection part 92 of the main flow path 2 and the fermentation tank assembly 11.

The main valve 9 may be opened when hot water is injected into the beverage ingredient pack 12, to open the main flow path 2. The main valve 9 may be closed while the fermentation tank assembly 11 is cooled, to close the main flow path 2. The main valve 9 may be opened when air is injected into the beverage ingredient pack 12, to open the main flow path 2. The main valve 9 may be opened when an additive is supplied to the inside of the beverage ingredient pack 12, to open the main flow path 2. The main valve 9 may be closed while ingredients are being fermented, to close the inside of the beverage ingredient pack 12. The main valve 9 may be closed when the beverage is ripened and kept, to close the inside of the beverage ingredient pack 12. The main valve 9 may be opened when the beverage is extracted from the beverage extractor 6, to open the main flow path 2.

Figure 2:
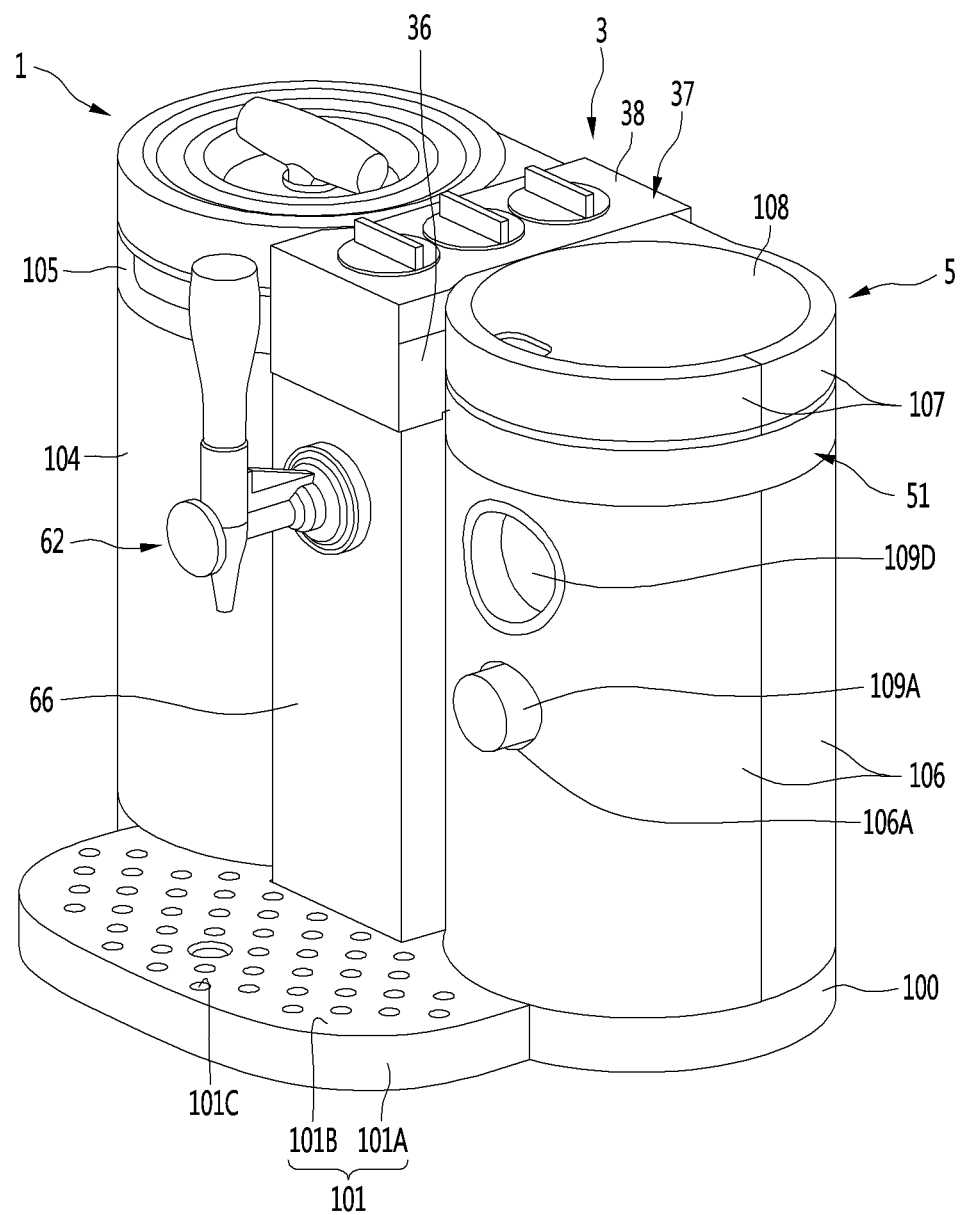
FIG. 2 is a diagram illustrating an example of a perspective view of the beverage-making apparatus according to some implementations.
Figure 3:
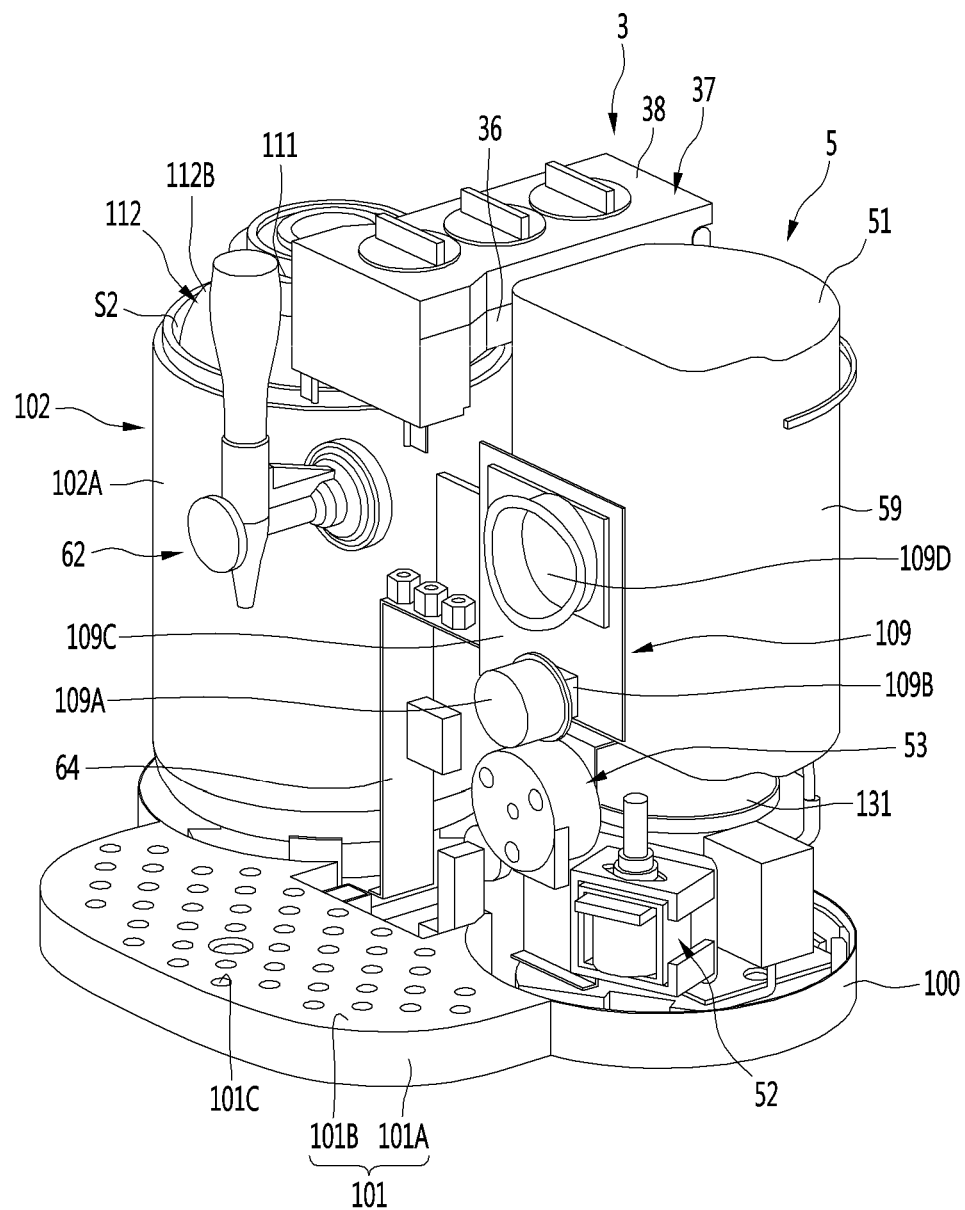
FIG. 3 is a diagram illustrating an example of a perspective view illustrating an inside of the beverage-making apparatus according to some implementations.
Figure 4:
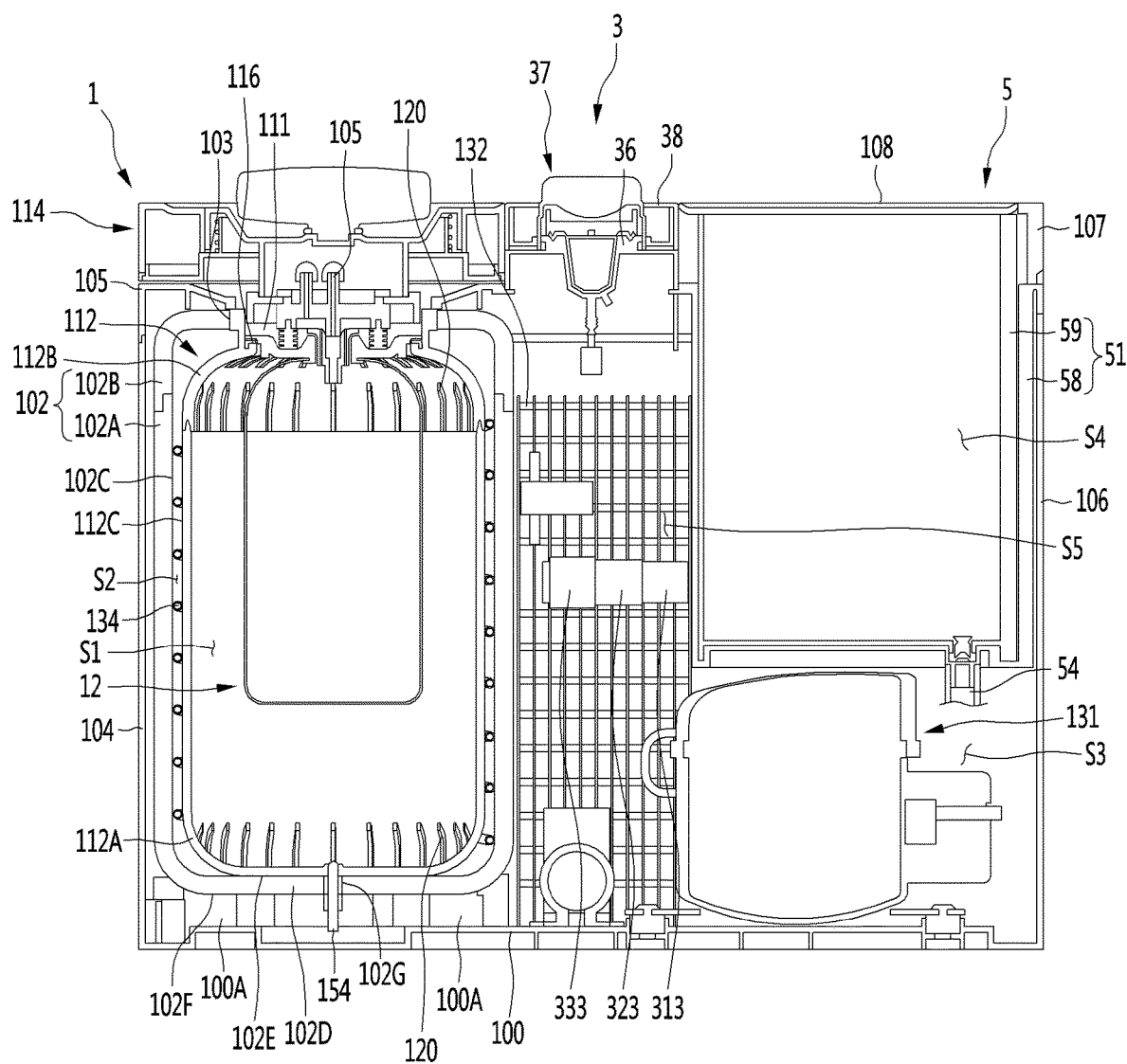
FIG. 4 is a diagram illustrating an example of a front view illustrating an inside of the beverage-making apparatus according to some implementations.

FIG. 2 is a perspective view of the beverage maker according to some implementations. FIG. 3 is a perspective view illustrating an inside of the beverage maker according to some implementations. FIG. 4 is a front view illustrating an inside of the beverage maker according to some implementations.

The beverage maker may further include a base 100. The base 100 may form a bottom appearance of the beverage maker, and support the fermentation tank assembly 11, the compressor 131, the water supply heater 53, the water supply pump 52, the water tank 51, and the like, which are located at the top side thereof.

The beverage maker may further include a beverage container 101 configured to receive and keep beverage dropping from the beverage extraction valve 62. The beverage container 101 may be integrally formed with the base 100 or be coupled to the base 100.

The beverage container 101 may include a container body 101A having a space in which the beverage dropping from the beverage extraction valve 62 is accommodated. The beverage container 101 may include a container top plate 101B disposed at the top surface of the container body 101A to cover the space in the container body 101A.

The container body 101A may be formed to protrude forward at a front portion of the base 100. The top surface of the container body 101A may be opened.

Holes 101C through which the beverage drops into the container body 101A may be formed in the container top plate 101B.

Beverage dropping around a beverage container in the beverage dropping from the beverage extraction valve 62 may drop to the container top plate 101B, and be temporarily kept inside the beverage container 101 through the holes 101C of the container top plate 101B. Thus, surroundings of the beverage maker can be cleanly maintained.

The fermentation tank 112, as shown in FIG. 4, may include a lower fermentation tank 112A of which top surface is opened, the lower fermentation tank 112A having a space formed therein, and an upper fermentation tank 112B disposed at the top of the lower fermentation tank 112A, the upper fermentation tank 112B having the opening 111 formed in the top surface thereof.

A seat part 116 on which the beverage ingredient pack 12 is mounted may be provided in the fermentation tank 112. The seat part 116 may be provided to protrude from the opening 111, and a circumferential part of the beverage ingredient pack 12 may be mounted on the seat part 116.

The beverage maker may include the heat insulating wall 102 surrounding both of the fermentation tank 112 and the evaporator 134.

The heat insulating wall 102 may be formed of polystyrene foam or the like, which has high heat insulation performance and can absorb vibration.

A heat insulating wall opening 103 may be formed at an upper portion of the heat insulating wall 102, and the heat insulating space S2 may be formed inside the heat insulating wall 102.

The heat insulating wall 102 may be configured as an assembly of a plurality of members. The heat insulating wall 102 may include a lower heat insulating wall 102A of which top surface is opened, the lower heat insulating wall 102A having a space formed therein, and an upper heat insulating wall 102B disposed at the top of the lower heat insulating wall 102A, the upper heat insulating wall 102B having the heat insulating wall opening 103 formed in the top surface thereof.

The heat insulating wall 102 having the lower heat insulating wall 102A and the upper heat insulating wall 102B may surround the circumferential and bottom surfaces of the fermentation tank 112.

The heat insulating wall opening 103 of the heat insulating wall 102 may surround an upper portion of the fermentation tank 112. The heat insulating wall opening 103 of the heat insulating wall 102 may surround the outer surface of a portion at which the heat insulating wall opening 103 is formed in the fermentation tank 112.

An inner surface 102C of the heat insulating wall 102 may have a larger diameter than an outer surface 112C of the fermentation tank 112, and a gap may be formed between the inner surface 102C of the heat insulating wall 102 and the outer surface 112C of the fermentation tank 112. Air may be filled in the gap, and the air between the inner surface 102C of the heat insulating wall 102 and the outer surface 112C of the fermentation tank 112 may heat-insulate the fermentation tank 112. The gap between the inner surface 102C of the heat insulating wall 102 and the outer surface 112C of the fermentation tank 112 may be a space in which the evaporator 134 is accommodated, and simultaneously be a space that can minimize a change in temperature of the fermentation tank 112.

The fermentation tank 112 may be mounted on a top surface 102E of a bottom plate part 102D of the heat insulating wall 102, and be supported by the top surface 102E of the bottom plate part 102D of the heat insulating wall 102.

A bottom surface 102F of the bottom plate part 102D of the heat insulating wall 102 may be placed on a heat insulating wall supporter 100A formed on the top surface of the base 100.

An air supply flow path through-hole 102G through which the air supply flow path 154 passes may be formed in the bottom plate part 102D of the heat insulating wall 102. The air supply flow path through-hole 102G may form at least part of a channel that is communicative with a space that is formed in the interior of the container body between a wall of the container body and the beverage ingredient pack 12 mounted inside the container body. Air that is supplied through this channel may exert pressure on the flexible beverage ingredient pack 12, causing the manufactured beverage to be extracted. At least a portion of the air supply flow path 154 may be formed through the heat insulating wall 102, and be connected to the fermentation tank 112.

In some implementations, the evaporator 134 may be an evaporating tube wound around the outer surface of the fermentation tank 112 to be located in the gap. The evaporator 134 may be in contact with each of the outer surface 112C of the fermentation tank 112 and the inner surface 102C of the heat insulating wall 102. The evaporator 134 may be supported by the heat insulating wall 102.

The evaporator 134 may include an extending tube extending to the outside of the heat insulating wall 102 by passing through an evaporating tube through-hole formed in the heat insulating wall 102.

The beverage maker may include a heat insulating wall cover 104 and 105 surrounding the circumferential and top surfaces of the heat insulating wall 102.

The heat insulating wall cover 104 and 105 may be configured as one cover, and be configured as an assembly of a plurality of covers.

The heat insulating wall cover 104 and 105 may include a lower heat insulating wall cover 104 of which bottom surface is opened, the lower heat insulating wall cover 104 surrounding the outer circumferential surface of the heat insulating wall 102, and an upper heat insulating wall cover 105 disposed at the top of the lower heat insulating wall cover 104, the upper heat insulating wall cover 105 covering the top surface of the heat insulating wall 102.

A lower portion of the lower heat insulating wall cover 104 may be placed on the base 100.

A lower portion of the upper heat insulating wall cover 105 may be placed on the top end of the lower heat insulating wall cover 104.

The heat insulating wall cover 104 and 105 may protect the heat insulating wall 102, and form a portion of the appearance of the beverage maker.

The heat insulating wall cover 104 and 105 may surround the entire circumferential surface of the heat insulating wall 102, and surround only a portion of the circumferential surface of the heat insulating wall 102.

A side opening may be formed in a surface of the heat insulating wall cover 104 and 105, which faces the water tank 51. The extending tube of the evaporator 134 may be disposed to pass through the side opening. The extending tube of the evaporator 134 may extend to an accommodation space S5 shown in FIG. 4, which will be described later, by passing through the side opening of the heat insulating wall cover 104 and 105.

In some implementations, the water tank 51 may be spaced apart from the base 100 at the top side of the base 100. The water tank 51 may be spaced apart from the base 100 in the vertical direction. A space S3 in which at least one of the compressor 131, the water supply heater 53, and the water supply pump 52 is to be accommodated may be formed between the water tank 51 and the base 100. In addition, the water tank 51 may be spaced apart from the heat insulating wall 102 in the horizontal direction.

The beverage maker may include a water tank supporter 106 supporting the water tank 51 to be spaced apart from the base 100. The water tank supporter 106 may be disposed at the base 100, and support the water tank 51 to be spaced apart from the base 100 at the top side of the base 100. The bottom end of water tank supporter 106 may be placed on the base 100, and the water tank 51 may be placed at an upper portion of the water tank supporter 106.

The water tank supporter 106 may be configured such that a plurality of supporter members are coupled in a hollow cylindrical shape. A side opening may be formed in a surface of the water tank supporter 106, which faces the heat insulating wall 102.

The water tank 51 may include an outer water tank 58, and an inner water tank 59 accommodated in the outer water tank 58, the inner water tank 59 in which a space S4 having water accommodated therein is formed.

The outer water tank 58 may be placed at an upper portion of the water tank supporter 106, and the bottom surface of the outer water tank 58 may be spaced apart from the top surface of the base 100. The space S3 in which at least one of the compressor 131, the water supply heater 53, and the water supply pump 52 is to be accommodated may be formed between the outer water tank 58 and the base 100.

The outer water tank 58 may have a vessel shape of which top surface is opened, and protect the inner water tank 59 by surrounding the outer circumferential and bottom surfaces of the inner water tank 59 located therein.

The inner water tank 59 may be inserted into the outer water tank 58, and be supported by the outer water tank 58.

The beverage maker may further include a water tank protector 107 disposed at the top side of the outer water tank 58 to surround an upper outer circumferential surface of the inner water tank 59. The water tank protector 107 may be disposed to surround the entire or a portion of the upper outer circumferential surface of the inner water tank 59. The water tank protector 107 may be configured such that a plurality of protector members are coupled in a ring shape.

The beverage maker may further include a water tank lid 108 coupled to the water tank 51 or the water tank protector 107 to cover the top surface of the water tank 51. One side of the water tank lid 108 may be rotatably connected to the water tank 51 or the water tank protector 107. The water tank lid 108 may be separably mounted on the top surface of the water tank 51 or the water tank protector 107.

In some implementations, at least one of the compressor 131, the water supply heater 53, and the water supply pump 52 may be disposed between the base 100 and the water tank 51.

The condenser 132 may be disposed to face at least one of the space between the heat insulating wall 102 and the water tank 51, and the heat insulating wall 102.

The supplier 3 may be disposed between the fermentation tank cover 114 and the water tank 51. In this case, the beverage maker may be compactly manufactured as compared with when the supplier 3 is located at a position except the space between the fermentation tank cover 114 and the water tank 51, and the supplier 3 may be protected by the fermentation tank cover 114 and the water tank 51.

As shown in FIG. 4, one side of the supplier 3 may be mounted on the outer water tank 58, and the other side of the supplier 3 may be mounted on the heat insulating wall cover 104 and 105. The supplier 3 may be vertically spaced apart from the base 100 at the top side of the base 100.

The supplier 3 may include a capsule accommodation body 36 having the capsule accommodation part in which the capsules C1, C2, and C3 shown in FIG. 1 are attachably/detachably accommodated, and a lid module 37 covering the capsule accommodation part.

One side plate facing the water tank 51 among left and right side plates of the capsule accommodation body 36 may be mounted on a mounting part formed in the outer water tank 58 to be supported by the outer water tank 58.

The other side plate facing the fermentation tank cover 114 among the left and right side plates of the capsule accommodation body 36 may be mounted on the heat insulating wall cover 104 and 105, and be supported by the heat insulating wall cover 104 and 105.

The lid module 37 may include a lid 38 covering the capsule accommodation body 36. The lid 38 may be slidingly disposed at the capsule accommodation body 36 or be rotatably connected to the capsule accommodation body 36. The lid 38 may be hinge-connected to the capsule accommodation body 36.

The supplier 3 may be installed to be located at an approximately central upper portion of the beverage maker, and the user may easily mount or separate the capsules C1, C2, and C3 by upwardly rotating the lid module 37 of the supplier 3.

The accommodation space S5 in which a plurality of parts are to be accommodated may be formed in the beverage maker. Here, the accommodation space S5 may be a space that becomes a space between the heat insulating wall 102 and the water tank 51 in the left-right direction and becomes a space between the supplier 3 and the base 100 in the top-bottom direction.

In the beverage maker, a plurality of parts are preferably accommodated in the accommodation space S5. In this case, the beverage maker may become compact. The plurality of parts accommodated in the accommodation space S5 may be protected by being surrounded by the heat insulating wall 102, the water tank 51, the base 100, the supplier 3, the condenser 132, and a center cover 66 which will be described later.

The opening/closing valves 313, 323, and 333 installed in the supplier entrance flow paths 311, 321, and 331 shown in FIG. 1 to open/close the supplier entrance flow paths 311, 321, and 331, as shown in FIG. 4, may be located under the capsule accommodation body 36.

The opening/closing valves 313, 323, and 333 may be installed in a bracket 64 (see FIG. 3) disposed at the base 100.

The bracket 64 may be disposed to be located at a side of the heat insulating wall 102, and the opening/closing valves 313, 323, and 333 may be installed to be located between the heat insulating wall 102 and the water tank 51 by the bracket 64. The opening/closing valves 313, 323, and 333 may be located between the heat insulating wall 102 and the water tank 51 in the left-right direction, and be located between the base 100 and the supplier 3 in the top-bottom direction.

The beverage maker may further include the center cover 66 covering the front of the opening/closing valves 313, 323, and 333.

The center cover 66, as shown in FIG. 2, may be disposed to cover between the heat insulating wall cover 104 and the water tank supporter 106 in the left-right direction and cover between the supplier 3 and the base 100 in the top-bottom direction. The rear surface of the center cover 66 may face the condenser 132 in the front-rear direction, and protect a plurality of parts.

In addition, a front portion of the supplier 3 may be placed on the top end of the center cover 66, and the supplier 3 may be supported by the center cover 66.

In some implementations, the beverage extraction valve may be mounted to the center cover 66. The beverage extraction valve 62 may be mounted to protrude forward from the center cover 66. The beverage extraction valve 62 may be mounted to the center cover 66 to be located at the top side of the beverage container 101.

The beverage maker may include a controller 109 that controls the beverage maker.

The controller 109 may include a main PCB 109C.

The controller 109 may include a wireless communication element that performs wireless communication with a wireless communication device such as a remote controller or a portable terminal. The wireless communication element, such as a Wi-Fi module or a Bluetooth module, is not limited to its kind as long as it can perform wireless communication with a remote controller or a wireless communication device. The wireless communication element may be mounted on the main PCB 109C or a display PCB which will be described later.

The controller 109 may include an input unit that receives a command related to the manufacturing of the beverage maker. The input unit may be any suitable mechanical and/or electronic input unit. For example, the input unit may include a rotary knob 109A and a rotary switch 109B switched by the rotary knob 109A. A knob hole 106A through which the rotary knob 109A rotatably passes may be formed at one side of the water tank supporter 106. The rotary knob 109A may be disposed such that at least one portion of the rotary knob 109A is exposed to the outside. The rotary switch 109B may be mounted on the main PCB 109C. As another example, the input unit may include a touch screen that receives a command of the user in a touch-based manner. The touch screen may be provided in a display 109D which will be described later. The user may input a command through the remote controller or the wireless communication device, and the controller 109 may receive the command of the user through the wireless communication element.

The controller 109 may include the display 109D that displays various information of the beverage maker. The display 109D may include a display element such as LCD, LED, or OLED. The display 109D may include the display PCB on which the display element is mounted. The display PCB may be mounted on the main PCB 109C or be connected to the main PCB 109C through a separate connector.

The display 109D may display information that has been input through the input unit.

The display 109D may display information of the beverage brewing pack 12 and information on a fermentation time of beverage ingredients, a beverage completion time, or the like. The fermentation time of the beverage ingredients or the beverage completion time may be changed depending on kinds of the beverage ingredients contained in the beverage brewing pack 12. If beverage brewing pack 12 approaches the fermentation tank assembly 11, the controller 109 may acquire information from the beverage brewing pack 12 through a communication module such as NFC.

In some implementations, a compact chip in which various information related to the beverage ingredients may be attached in the shape of a sticker, etc. to the beverage brewing pack 12, and the chip and an NFC tag that transmits/receives data may be installed in the beverage maker. In such implementations, the NFC tag may be mounted on the fermentation tank assembly 11, the main PCB 109C, or the display PCB. When the NFC tag is mounted on the fermentation tank assembly 11, the NFC tag may be mounted on the opening 111 of the fermentation tank 112 or the fermentation tank cover 114. The NFC tag may be connected to the controller 109 through a data line.

If the beverage brewing pack 12 is accommodated in the fermentation tank assembly 11, the controller 109 may acquire information of the beverage brewing pack 12 from a chip provided in the beverage brewing pack 12.

In some implementations, when the NFC tag is installed on the display PCB, the NFC tag may be installed at a front portion of the beverage maker. If the beverage brewing pack 12 comes close to the front portion of the beverage maker by the user, the controller 109 may acquire information related to beverage-making ingredients from the beverage brewing pack 12.

The controller 109 may transmit the information acquired from the NFC tag to the display 109D or the wireless communication device, and the display 109D or the wireless communication device may display kinds of beverage ingredients, a total fermentation time, a beverage completion time, or the like.

In some implementations, the controller 109 may acquire information related to beverage-making ingredients from the wireless communication device through the wireless communication element. The wireless communication device may receive the information related to the beverage-making ingredients from the user, or acquire the information related to the beverage-making ingredients from the beverage brewing pack 12 using an NFC communication module. The wireless communication device may transmit the acquired information to the beverage-making apparatus.

The display 109D may display various information related to brewing of beverage while the beverage is being brewed. The controller 109 may be connected to the temperature sensor 16. The controller 109 may transmit information on a temperature sensed by the temperature sensor 16 to the display 109D or the wireless communication device, and the display 109D or the communication device may display the temperature sensed by the temperature sensor 16 through a numerical value, a graph, or the like.

The display 109D may display a completion degree of the beverage, an amount of carbonic acid contained in the beverage, or the like through a numerical value, a graph, or the like while the beverage is being brewed.

The display 109D may differently display a completion degree of the beverage in primary fermentation and a completion degree of the beverage in secondary fermentation. The amount of carbonic acid in the beverage of the beverage brewing pack 12 may be gradually increased as time elapses. The controller 109 may detect a pressure in the beverage brewing pack 12 through the pressure sensor 72, and detect a temperature of the fermentation tank assembly 11 through the temperature sensor 16. The controller 109 may calculate an amount of carbonic acid using the detected pressure and temperature according to a preset equation or table. The controller 109 may transmit information on the calculated amount of carbonic acid to the display 109D or the wireless communication device, and at least one of the display 109D and the wireless communication device may display the calculated amount of carbonic acid.

The display 109D may display a remaining amount of the beverage after the beverage is completely brewed.

If the secondary fermentation which will be described later is ended, the controller 109 may determine that the beverage has been completely brewed.

The controller 109 may add up at least one of a time required to turn on the micro switch, a time required to drive the air pump 152, and a time required to turn on the main valve 9 after the beverage is completely brewed. The controller 109 may calculate an extraction amount of the beverage according to the added-up time, and calculate a remaining amount of the beverage from the calculated extraction amount. The controller 109 may transmit information on the remaining amount of the beverage to the display 109D or the wireless communication device, and at least one of the display 109D and the wireless communication device may display the remaining amount of the beverage.

Figure 5:
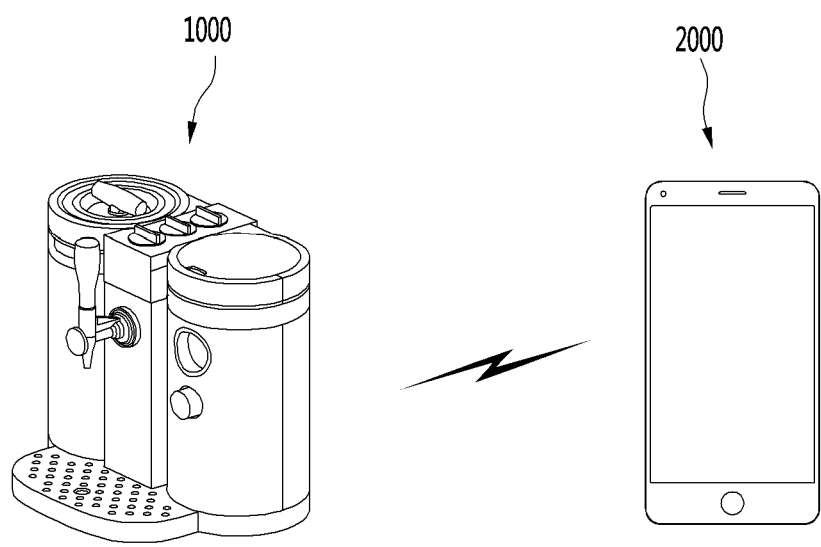
FIG. 5 is a diagram illustrating an example of a system including a beverage-making apparatus and a mobile terminal connected to the beverage-making apparatus according to some implementations.

FIG. 5 is a diagram illustrating an example of a system including a beverage-making apparatus and a mobile terminal connected to the beverage-making apparatus according to an implementation.

Referring to FIG. 5, the system may include a beverage-making apparatus 1000 and a mobile terminal 2000 connected to the beverage-making apparatus 1000. The beverage-making apparatus 1000 shown in FIG. 5 may correspond, for example, to the beverage-making apparatus described in FIGS. 1 to 4.

The beverage-making apparatus 1000 and the mobile terminal 2000 may be connected through wireless communications, for example through a wireless communication protocol. The wireless communication protocol may be, for example, Wi-Fi, Bluetooth, ZigBee, or any other suitable wireless communication protocol. As other examples, the mobile terminal 2000 may communicate with the beverage-making apparatus 1000 using short-range wireless communication signals, or may indirectly communicate via an intermediate device, such as a relay or a router.

The beverage-making apparatus 1000 may transmit various information related to the beverage-making apparatus 1000 to the mobile terminal 2000. The various information may include, for example, information related to an on/off state of the beverage-making apparatus 1000, information related to a type of the beverage-making apparatus 1000, information related to beverage ingredients acquired from the beverage brewing pack 12 and/or supplier 3 of apparatus 1000, beverage brewing information based on beverage ingredients of the apparatus 1000, and/or beverage maintenance or storage information related to the apparatus 1000.

The mobile terminal 2000 may store one or more programs, such as applications, that when executed by one or more processors, perform operations of providing brewing information regarding the beverage-making apparatus 1000. For example, if the stored application is executed, the mobile terminal 2000 may display information received from the beverage-making apparatus 1000, such as information regarding ingredients or recipes for making a beverage using apparatus 1000, or remotely control an operation of the beverage-making apparatus 1000 based on the displayed information.

The mobile terminal 2000 may include, for example, a cellular phone, a smart phone, a laptop computer, a terminal for digital broadcast, a personal digital assistant (PDA), a portable multimedia player (PMP), a navigation system, a tablet PC, an ultrabook, a wearable device (e.g., a smartwatch, a smart glass, or a head mounted display (HMD)), and the like. An example of a configuration of the mobile terminal 2000 will be described with reference to FIG. 6.

Figure 6:
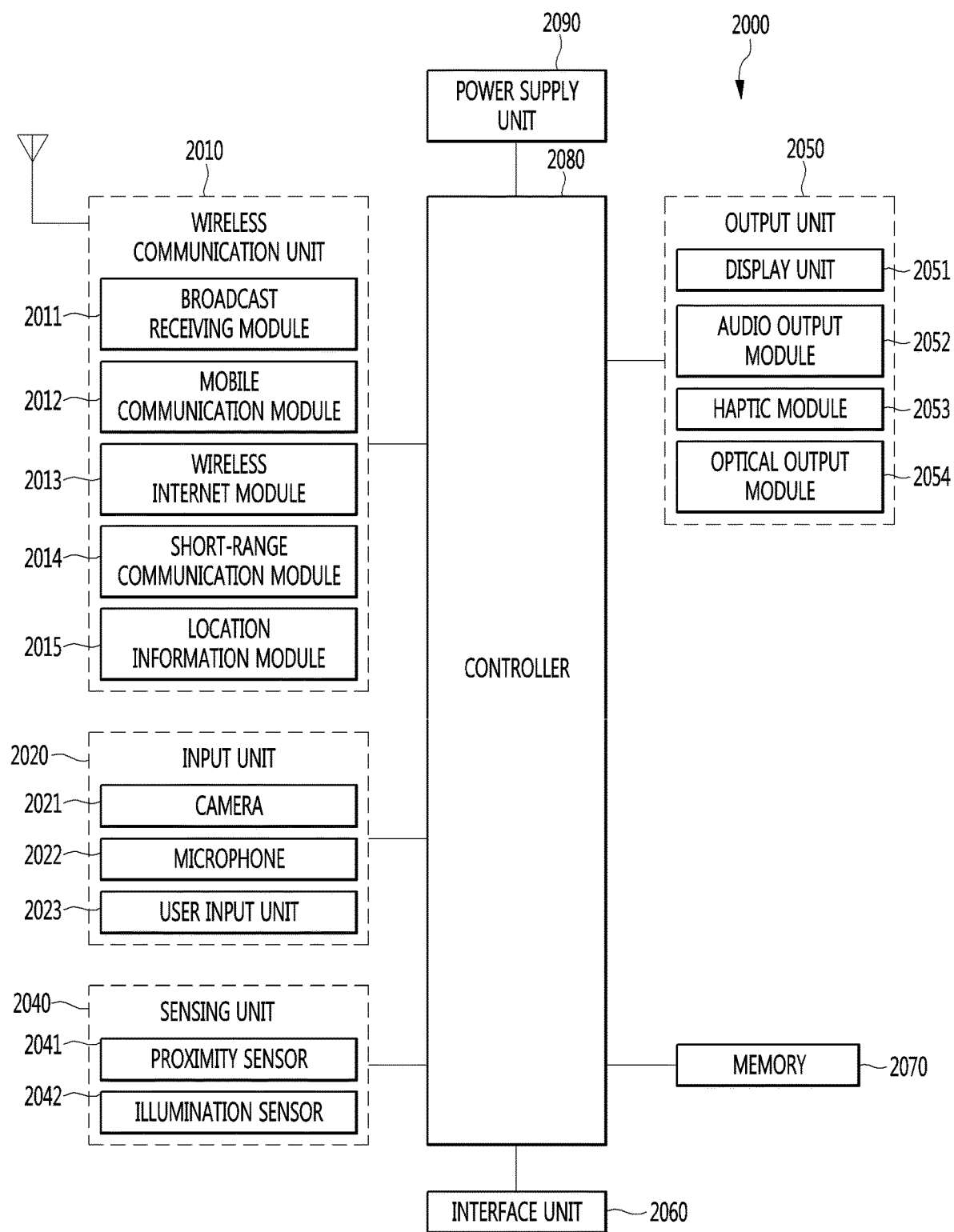
FIG. 6 is a block diagram illustrating an example of a mobile terminal according to some implementations.

FIG. 6 is a schematic block diagram of an example of a mobile terminal according to an implementation.

In this example, the mobile terminal 2000 is shown having components such as a wireless communication unit 2010, an input unit 2020, a sensing unit 2040, an output unit 2050, an interface unit 2060, a memory 2070, a controller 2080, and a power supply unit 2090. However, not all implementations of the present disclosure necessarily implement all of the illustrated components in FIG. 6, and greater or fewer components may alternatively be implemented.

Referring to FIG. 6, the mobile terminal 2000 is shown having wireless communication unit 2010. The wireless communication unit 2010 includes one or more components which enable wireless communication between the mobile terminal 2000 and other devices, such as the beverage-making apparatus 1000 or other devices on a wireless communication system or network with which the mobile terminal 2000 is communicative.

In this example, the wireless communication unit 2010 includes one or more modules which enable communications, e.g., wireless communications between the mobile terminal 2000 and a wireless communication system, communications between the mobile terminal 2000 and another device or mobile terminal, and/or communications between the mobile terminal 2000 and an external server. Further, the wireless communication unit 2010 includes one or more modules which connect the mobile terminal 2000 to other devices. To facilitate such communications, in the example of FIG. 6, the wireless communication unit 2010 includes one or more of a broadcast receiving module 2011, a mobile communication module 2012, a wireless Internet module 2013, a short-range communication module 2014, and a location information module 2015.

The mobile terminal 2000 in FIG. 6 also implements an input unit 2020, which includes a camera 2021 for obtaining images or video, a microphone 2022, which is one type of audio input device for inputting an audio signal, and a user input unit 2023 (for example, a touch key, a push key, a mechanical key, a soft key, and the like) for allowing a user to input information. Data (for example, audio, video, image, and the like) is obtained by the input unit 2020 and may be analyzed and processed by controller 2080 according to device parameters, user commands, and combinations thereof.

The mobile terminal 2000 also includes a sensing unit 2040 that is implemented with one or more sensors configured to sense internal information of the mobile terminal 2000, the surrounding environment of the mobile terminal 2000, user information, and the like. For example, in FIG. 6, the sensing unit 2040 is shown having a proximity sensor 2041 and an illumination sensor 2042.

In some implementations, the sensing unit 2040 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 2021), a microphone 2022, a battery gauge, an environment sensor (for example, a barometer, a hygrometer, a thermometer, a radiation detection sensor, a thermal sensor, and a gas sensor, among others), a chemical sensor (for example, an electronic nose, a health care sensor, a biometric sensor, and the like), to name a few. The mobile terminal 2000 may be configured to utilize information obtained from sensing unit 2040, and in particular, information obtained from one or more sensors of the sensing unit 2040, and combinations thereof.

The mobile terminal 2000 also includes an output unit 2050 configured to output various types of information, such as audio, video, tactile output, and the like. In the example of FIG. 6, the output unit 2050 is shown having a display unit 2051, an audio output module 2052, a haptic module 2053, and an optical output module 2054.

The display unit 2051 may have an inter-layered structure or an integrated structure with a touch sensor in order to facilitate a touch screen. The touch screen may provide an output interface between the mobile terminal 2000 and a user, as well as providing a function as the user input unit 2023 which provides an input interface between the mobile terminal 2000 and the user.

The mobile terminal 2000 of FIG. 6 also implements an interface unit 2060, which serves as an interface with various types of external devices that can be coupled to the mobile terminal 2000. The interface unit 2060, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 2000 may perform assorted control functions associated with a connected external device, in response to the external device being connected to the interface unit 2060.

The mobile terminal 2000 also implements a memory 2070 that stores data to support various functions or features of the mobile terminal 2000. For instance, the memory 2070 may be configured to store application programs executed in the mobile terminal 2000, data or instructions for operations of the mobile terminal 2000, and the like. Some of these application programs may be downloaded from an external server via wireless communication. Other application programs may be installed within the mobile terminal 2000 at time of manufacturing or shipping, which is typically the case for basic functions of the mobile terminal 2000 (for example, receiving a call, placing a call, receiving a message, sending a message, and the like). It is common for application programs to be stored in the memory 2070, installed in the mobile terminal 2000, and executed by the controller 2080 to perform an operation (or function) for the mobile terminal 2000. Although the memory 2070 is shown in FIG. 6 as being a component that is separate and distinct from other components of FIG. 6, implementations are not limited thereto, and the memory 2070 may represent a collection of different memory elements that are implemented in different components of FIG. 6.

The mobile terminal 2000 also includes one or more processors, such as controller 2080, which functions to control overall operation of the mobile terminal 2000, in addition to the operations associated with the application programs. The controller 2080 may provide or process information or functions appropriate for a user by processing signals, data, information and the like, which are input or output by the various components depicted in FIG. 6, or activating application programs stored in the memory 2070.

As one example, the controller 2080 controls some or all of the components illustrated in FIGS. 1A-1C according to the execution of an application program that have been stored in the memory 2070. Although the controller 2080 is shown in FIG. 6 as being a component that is separate and distinct from other components of FIG. 6, implementations are not limited thereto, and the controller 2080 may represent a collection of different processors that are implemented in different components of FIG. 6.

The mobile terminal 2000 also includes a power supply unit 2090 that is configured to receive external power or provide internal power in order to supply appropriate power required for operating elements and components included in the mobile terminal 2000. In some implementations the power supply unit 2090 may include a battery, and the battery may be configured to be embedded in the terminal body, or configured to be detachable from the terminal body.

Various implementations described herein may be implemented in a computer-readable medium, a machine-readable medium, or similar medium using, for example, software, hardware, or any combination thereof.

The mobile terminal 2000 may perform operations, e.g., via an application, that controls operations of the beverage-making apparatus 1000 that is communicative to the mobile terminal 2000. The mobile terminal 2000 may also exchange various types of information with the beverage-making apparatus 1000 or various types of information related to a beverage that is produced by the beverage-making apparatus 1000. To perform such operations, the mobile terminal 2000 may execute an application downloaded from a computer, e.g., an external server, or may display interfaces that are generated by an application that is executed remotely by a computer.

For example, the controller 2080 of the mobile terminal 2000 may execute an installed application in response to an execution request of the application. As another example, the controller 2080 may perform operations in response to an application being executed remotely on a server. The controller 2080 may display various interfaces provided from the executed application through the display unit 2051. Examples of such operations and interfaces will be described further below.

Figure 7:
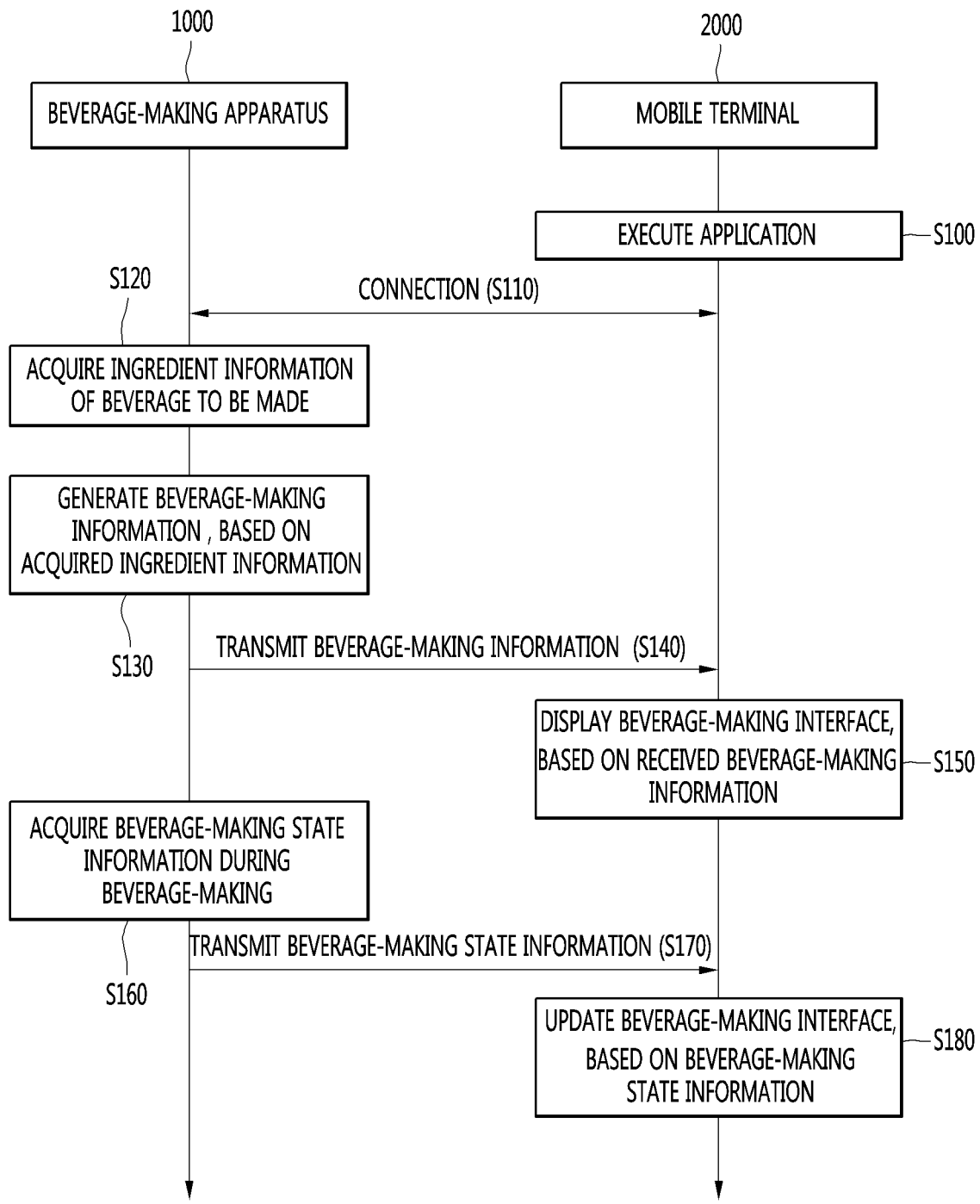
FIG. 7 is a diagram illustrating an example of a mobile terminal providing beverage-making information of a beverage-making apparatus according to an implementation.

FIG. 7 is a diagram illustrating an example of a mobile terminal providing beverage-making information of a beverage-making apparatus according to an implementation.

Referring to FIG. 7, if an application is executed, e.g., an application installed and executed in the mobile terminal 2000 or an application stored and executed on a remote computer, or any combination of client-server operations (S100), the mobile terminal 2000 may perform a connection to the beverage-making apparatus 1000 (S110).

Specifically, the application may be an application for providing a user with various information related to the beverage-making apparatus 1000. If the application is executed, the controller 2080 of the mobile terminal 2000 may perform a connection to the beverage-making apparatus 100. If the connection to the beverage-making apparatus 1000 is performed, the controller 2080 may display, e.g., through the display unit 2051, an operation state of the beverage-making apparatus 1000, a beverage brewing state of the beverage-making apparatus 1000, or the like.

In some implementations, the controller 2080 may automatically perform the connection to the beverage-making apparatus 1000, based on registration information of the beverage-making apparatus 1000. The registration information of the beverage-making apparatus 1000 to be connected to the mobile terminal 1000 may be stored, e.g., in the memory 2070 of the mobile terminal 1000. The registration information includes identification information for connection to the beverage-making apparatus 1000, and may be stored when a connection between the beverage-making apparatus 1000 and the mobile terminal 2000 is first performed.

On the other hand, if the registration information is not stored, i.e., when there exists no history that the connection to the beverage-making apparatus 1000 has been performed, the controller 2080 of mobile terminal 2000 may display a device registration interface for registering (e.g., storing registration information) the beverage-making apparatus 1000. If the beverage-making apparatus 1000 is registered based on the displayed device registration interface, then the controller 2080 may perform the connection to the beverage-making apparatus 1000.

Figure 8:
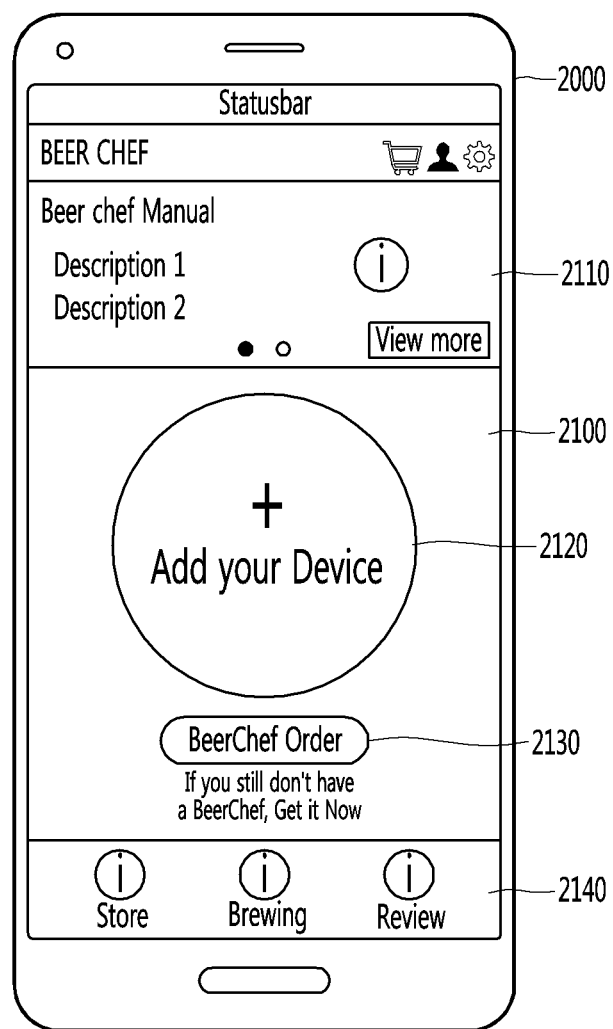
FIG. 8 is a diagram illustrating an example of a device registration interface displayed through the mobile terminal in a state in which there is no connection history between the mobile terminal and the beverage-making apparatus.
Figure 9:
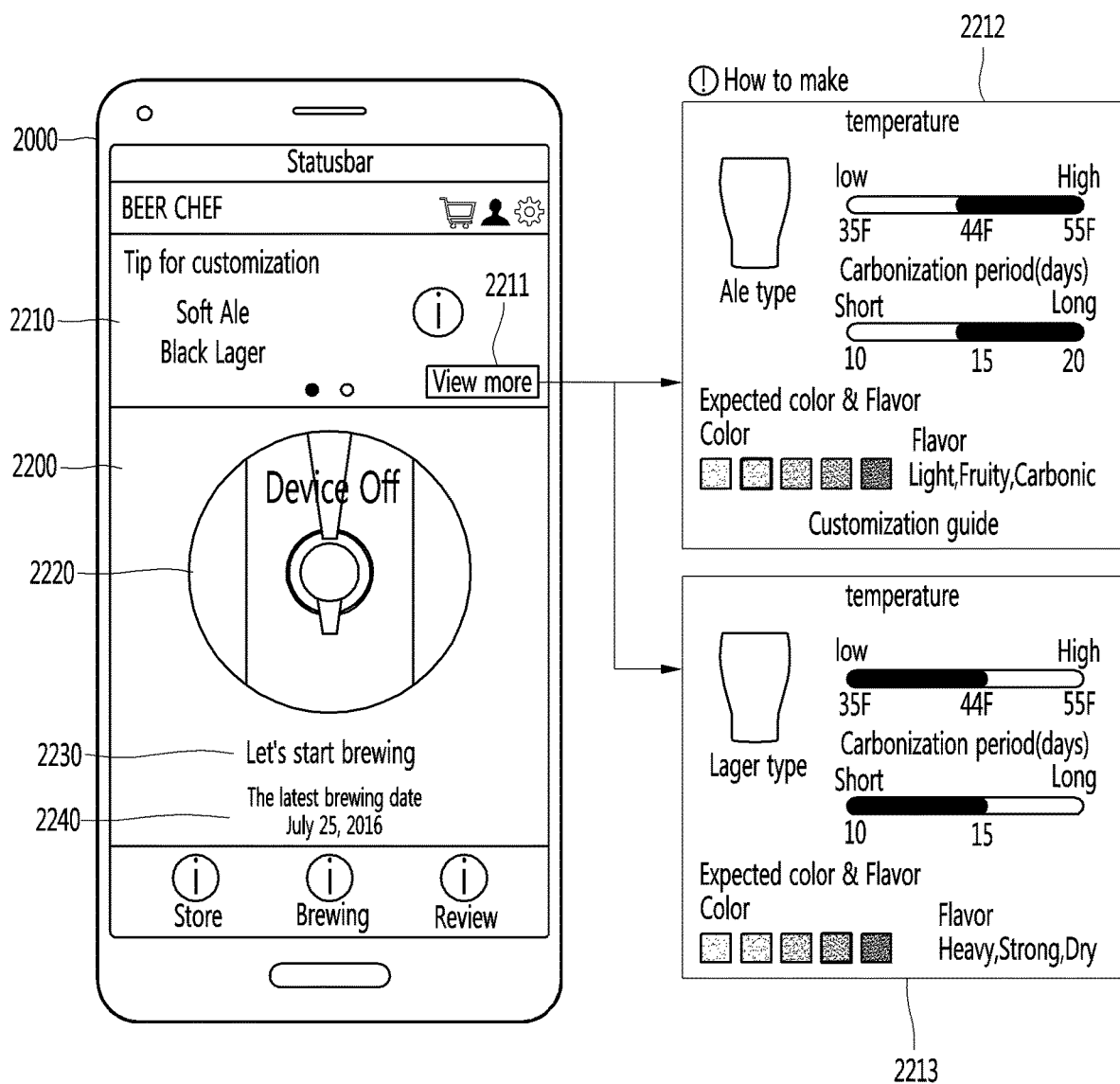
FIG. 9 is a diagram illustrating an example of an interface displayed through the mobile terminal prior to a beverage-making process is performed by the beverage-making apparatus.

FIGS. 8 and 9 will be described as examples related to steps S100 and S110.

FIG. 8 is a diagram illustrating an example of a device registration interface displayed through the mobile terminal in a state in which there is no connection history between the mobile terminal and the beverage-making apparatus.

Referring to FIG. 8, when there exists no connection history between the beverage-making apparatus 1000 and the mobile terminal 2000, the controller 2080 may display, e.g., through the display unit 2051, a device registration interface 2100 for registering the beverage-making apparatus 1000. For example, when the user first uses the beverage-making apparatus 1000 before or after the beverage-making apparatus is purchased by the user, the controller 2080 may display the device registration interface 2100.

For example, as shown in FIG. 8, the device registration screen 2100 may include a device manual window 2110 that provides a user manual of the beverage-making apparatus 1000, usage tips of the beverage-making apparatus 1000, and the like, a connection window 2120 for establishing a connection to the beverage-making apparatus 1000, a purchase icon 2130 for providing a purchasing function for purchasing the beverage-making apparatus 1000, and a menu tab 2140. The device registration screen 2100 shown in FIG. 8 is merely one example that is shown for convenience of description, and the shape and configuration of the device registration screen 2100 may be variously modified.

When the user desires to register the beverage-making apparatus 1000 to the mobile terminal 2000, the user may select (e.g., apply a touch input, etc.) the connection window 2120 included in the device registration screen 2100. The controller 2080 may receive an input for selecting the connection window 2120, and perform the connection to the beverage-making apparatus 1000 in response to the received input. For example, the controller 2080 may register the beverage-making apparatus 1000 by performing a search operation of the beverage-making apparatus 1000 to be connected and storing the registration information of the beverage-making apparatus 1000, searched as the performed result.

FIG. 9 is a diagram illustrating an example of an interface displayed through the mobile terminal prior to a beverage-making process is performed by the beverage-making apparatus.

Referring to FIG. 9, when the state of the beverage-making apparatus 1000 connected to the mobile terminal 2000 is a state before a beverage-making process of the beverage-making apparatus 1000, the controller 2080 may display an information screen 2200 including information for guiding the beverage-making process.

For example, the information screen 2200 may include a beverage-making guide window 2210 for providing guides or tips related to making of the beverage, a state window 2220 representing a state of the beverage-making apparatus 1000 connected to the mobile terminal 2000, and messages 2230 and 2240 for guiding the beverage-making process.

When a detailed information display icon 2211 is selected in relation to the beverage-making guide window 2210, the controller 2080 may display detailed information 2212 and 2213 related to a beverage-making method of a specific beverage.

The state window 2220 may represent a current operation state of the beverage-making apparatus 1000. For example, when the beverage-making apparatus 1000 is currently in an off-state, the state window 2220, as shown in FIG. 9, may include an image representing the off-state of the beverage-making apparatus 1000.

The user may thus conveniently utilize the beverage-making apparatus 1000, based on various information provided through the beverage-making guide window 2210 and the messages 2230 and 2240 for guiding the beverage-making process of various types of beverages.

Referring again to FIG. 7, the beverage-making apparatus 1000 may acquire ingredient information of a beverage to be made (S120). For example, as described in FIG. 1, if a beverage ingredient pack 12 is accommodated in the fermentation tank assembly 11 of the beverage-making apparatus 1000, then the controller 109 of the beverage-making apparatus 1000 may acquire information of the beverage ingredient pack 12, e.g., via an electronic communication device or chip provided in the beverage ingredient pack 12. In some implementations, the beverage-making apparatus 1000 may acquire ingredient information by receiving the ingredient information from the user through the display 109D.

As an example, if the beverage-making apparatus 1000 is utilized to make beer, then the ingredient information may include at least one of wort (or malt), yeast, hops, or flavor additives. In some implementations, the ingredient information may include information regarding a main ingredient among the ingredients, e.g., in the scenario of beer-making, information regarding wort as a main ingredient among the malt, the yeast, the hops, and the flavor additives.

The beverage-making apparatus 1000 may generate beverage-making information, based on the acquired ingredient information (S130), and transmit the generated beverage-making information to the mobile terminal 2000 (S140).

The beverage-making apparatus 1000 may generate beverage-making information including a beverage completion time, a set temperature of each step (e.g., primary fermentation, secondary fermentation, etc.) in the beverage-making process, a carbonic acid amount, and the like, which are set based on the acquired ingredient information. The carbonic acid amount may refer to an amount of carbon dioxide contained in the beverage being made (e.g., when carbonic acid is generated as carbon dioxide and water react). The beverage-making apparatus 1000 may start a beverage-making process, based on the generated beverage-making information. The mobile terminal 2000 may receive the beverage-making information from the beverage-making apparatus 1000. In some implementations, the beverage-making apparatus 1000 may transmit the acquired ingredient information to the mobile terminal 2000, and the mobile terminal 2000 may directly generate the beverage-making information, based on the received ingredient information.

The mobile terminal 2000 may display a beverage-making screen, based on the received beverage-making information (S150).

The beverage-making screen may include various information related to beverage-making, such as ingredient information of beverage to be made, a completion time of the beverage, a completion degree of the beverage, a current operation of the beverage-making apparatus 1000, a temperature in the fermentation tank, a carbonic acid amount, and the like.

The beverage-making apparatus 1000 may acquire beverage-making state information during the beverage-making process of the beverage (S160), and transmit the acquired beverage-making state information to the mobile terminal 2000 (S170).

For example, in some implementations, the beverage-making apparatus 1000 acquires, in real time or periodically or with any suitable timing, beverage-making state information as a beverage-making process is performed, and transmits the acquired beverage-making state information to the mobile terminal 2000, thereby providing a beverage-making state to the user.

The beverage-making state information may include, for example, information on a completion degree of the beverage-making process, a current stage of the beverage-making process (e.g., primary fermentation, secondary fermentation, ripening, etc.), a current temperature in the fermentation tank, a carbonic acid amount, and the like.

The mobile terminal 200 may update the beverage-making screen, based on the received beverage-making state information (S180).

The beverage-making screen that the mobile terminal 2000 displays based on the beverage-making information or the beverage-making state information will be described in more detail with reference with FIGS. 10 to 12B.

FIGS. 10 to 12B are diagrams illustrating examples of beverage-making interfaces displayed by the mobile terminal 2000 based on beverage-making information received from a beverage-making apparatus 1000 during a beverage-making process.

Figure 10:
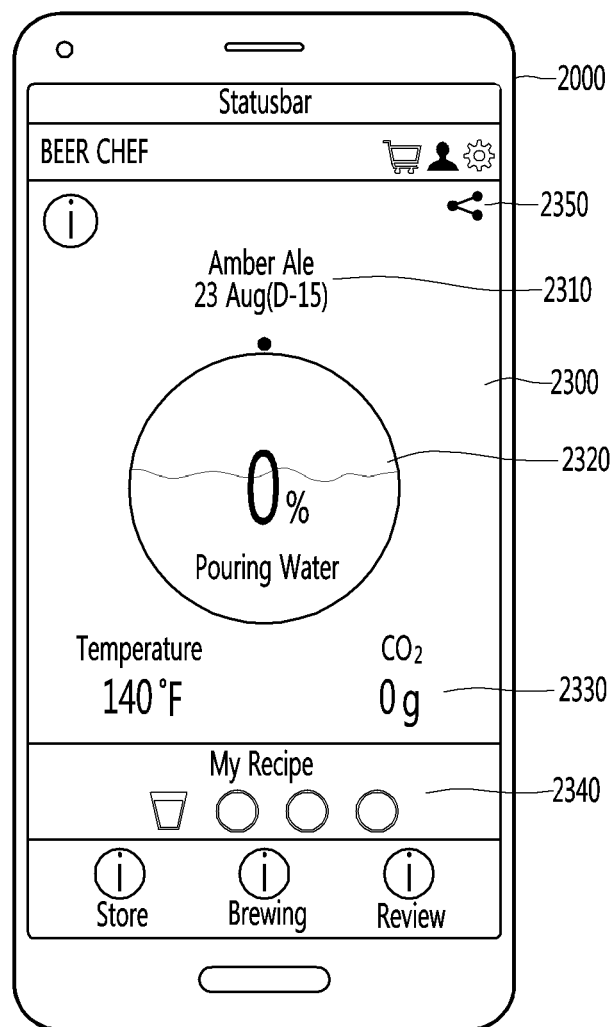
FIGS. 10 to 12B are diagrams illustrating examples of beverage-making interfaces displayed by the mobile terminal based on beverage-making information received from a beverage-making apparatus during a beverage-making process performed by the beverage-making apparatus.

Referring to FIG. 10, the controller 2080 may display a beverage-making screen 2300 through the display unit 2051, based on beverage-making information received from the beverage-making apparatus 100.

The beverage-making screen 2300 may include information 2310 regarding a name of the beverage (or a name of a main ingredient (e.g., wort) or a name of the beverage ingredient pack 12) which may be determined based on ingredient information and a beverage-making period set based on the ingredient information. The beverage-making screen 2300 may also include a beverage-making state window 2320 displaying a progress degree of the beverage being made and/or a stage of the beverage-making process, temperature and carbonic acid amount information 2330 in the fermentation tank, and recipe information 2340 of the beverage being made. In some implementations, the beverage-making screen 2300 may include a sharing icon 2350 for sharing a current beverage-making state of the beverage with others or uploading the current beverage-making state to a server or website, e.g., on a social networking site (SNS).

The beverage-making state window 2320 may represent a current beverage-making state of the beverage, e.g., using a number or text. The beverage-making state may include a beverage-making progress degree and/or a stage of beverage-making process. The beverage-making progress degree may be determined based on, for example, a beverage-making time of the beverage to be made and a currently elapsed time, or determined based on a currently performed stage of the beverage-making process.

In some implementations, the beverage-making state window 2320 may further display a beverage-making state image for intuitively displaying a beverage-making state of the beverage. The beverage-making state image may visually represent a color of beverage being made, a carbonic acid amount of the beverage being brewed, and the like.

The color of the beverage being made may be determined based on the acquired ingredient information. In addition, the carbonic acid amount of the beverage being made may be calculated by the controller 109 of the beverage-making apparatus 1000. Analogous to what was described with reference to FIG. 1, the controller 109 of apparatus 1000 may sense a pressure in the beverage ingredient pack 12 through the pressure sensor 72, and sense a temperature of the fermentation tank assembly 11 through the temperature sensor 16. The controller 109 may calculate a carbonic acid amount using the sensed pressure and temperature. The controller 109 may transmit the calculated carbon acid amount to the mobile terminal 2000. The controller 2080 of the mobile terminal 2000 may generate the beverage-making state image on the basis of information on the color of the beverage, determined based on the acquired ingredient information, and the received carbonic acid amount.

The temperature and carbonic acid amount information 2330 displayed on the beverage-making screen 2300 may represent the temperature in the fermentation tank, sensed by the temperature sensor 16, and the carbonic acid amount calculated by the temperature and pressure sensed by the temperature sensor 16 and the pressure sensor 72.

In some implementations, the temperature and carbonic acid amount information 2330 may represent information on a temperature and a carbonic acid amount, which are set based on the acquired ingredient information. For example, when a temperature (e.g., a fermentation temperature) set based on ingredient information, e.g., as acquired from the beverage ingredient pack 12, is 44 degrees Fahrenheit and a carbonic acid amount set based on the ingredient information acquired from the beverage ingredient pack 12, etc. is 7 g, the controller 2080 may display (e.g., continuously display) the temperature and carbonic acid amount information 2330 of the beverage-making screen 2300 as 44 degrees Fahrenheit and 7 g.

In addition, the carbonic acid amount information included in the beverage-making screen 2300 and a beverage keeping screen which will be described later may represent information on an amount of carbonic acid (or an amount of carbon dioxide) contained in the beverage. In some cases, the carbonic acid amount information may represent an intensity of carbonic acid. For example, the carbonic acid amount information may represent, as the intensity of carbonic acid, any one of discrete levels such as strong, middle, and weak. In general, representing the intensity of carbonic acid may be variously implemented.

As shown in FIG. 10, when water is being supplied to the fermentation tank as a beverage-making process is started (a water supplying step), the controller 2080 may display, on the beverage-making state window 2320 a beverage-making state image representing that water is being supplied.

In some implementations, a beverage-making process of the beverage-making apparatus 1000 may include various stages. For example, if the beverage-making apparatus 1000 is utilized to make beer, then the beverage-making process may include a water supply step, a primary fermenting step, and a second fermenting step. The water supplying step may include a step of forming liquid malt by supplying hot water to the inside of the fermentation tank and uniformly mixing malt and the hot water. The primary fermenting step may include a step of generating alcohol, and the secondary fermenting step may include a step of generating carbon dioxide.

As such, beverage-making state images may be differently displayed depending on current beverage-making stage in the beverage-making process. In addition, beverage-making state images may be differently displayed depending on states (e.g., carbonic acid amounts, etc.) of the beverage being made, even within the same stage of the beverage-making process.

Figure 11A:
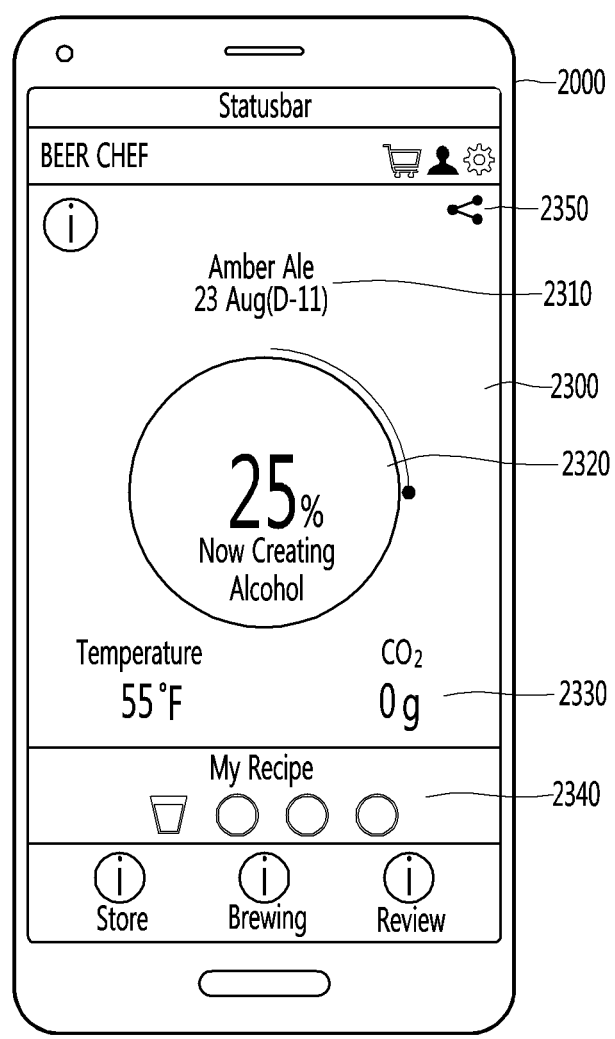
Figure 11B:
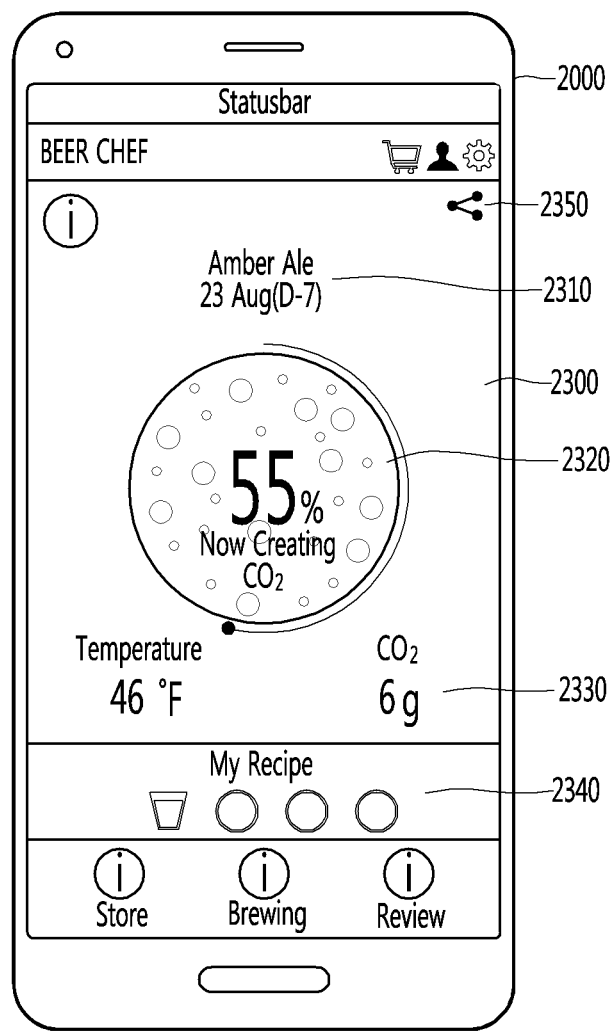
Figure 11C:
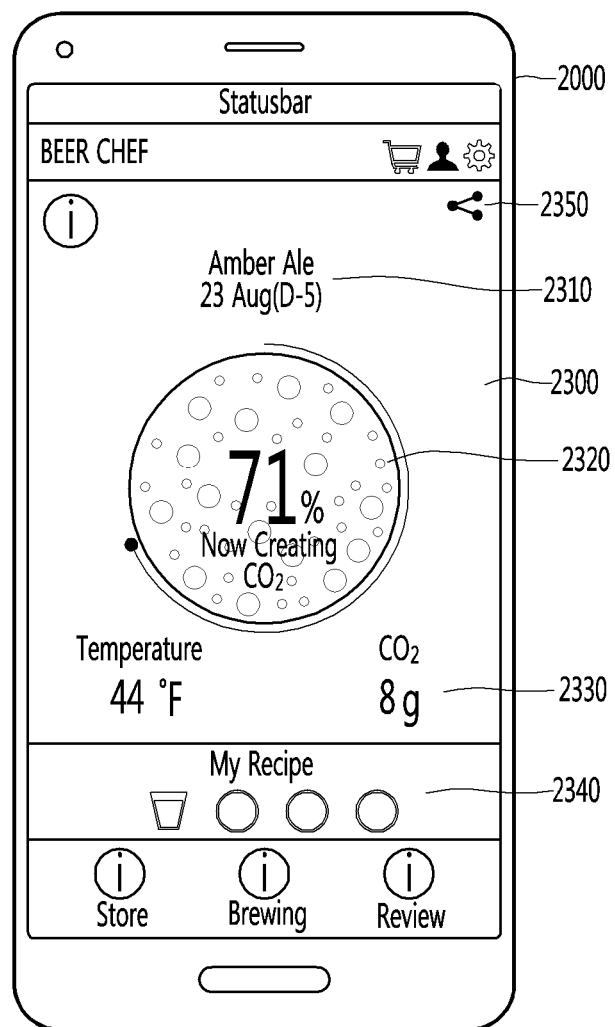

Referring to FIGS. 11A to 11C, the controller 2080 may receive beverage-making state information from the beverage-making apparatus 1000, and update the beverage-making screen 2300, based on the received beverage-making state information.

For example, by using the beverage-making screen 2300 updated as shown in FIG. 11A for making beer as a beverage, the user may check that the beverage-making process of the beverage has currently progressed to a degree of 25%, alcohol is being generated (or primary fermentation is being performed), the temperature in the fermentation tank is 55 degrees Fahrenheit, and no carbon dioxide (or carbon) has been generated. In some implementations, the controller 2080 may display, on the beverage-making state window 2320, a beverage-making state image representing that alcohol is currently being generated.

As the beverage-making process of the beverage progresses, the beverage-making screen 2300 may be updated as shown in FIG. 11B. By using the beverage-making screen 2300 for making beer as a beverage, the user may check that the beverage-making process of the beverage has currently progressed to a degree of 55%, carbon dioxide is being generated (or secondary fermentation is being performed), the temperature in the fermentation tank is 46 degrees Fahrenheit, and the amount of the generated carbon dioxide (or the amount of carbonic acid) is 6 g. The controller 2080 may display, on the beverage-making state window 2320, a beverage-making state image representing that carbon dioxide is currently being generated.

As such, by comparing the brewing state window 2320 of FIG. 11A with the brewing state window 2320 of FIG. 11B, if the beverage-making step of the beverage-making apparatus 1000 is changed from the primary fermentation step to the secondary fermentation step, it can be seen that contents of the beverage-making state window 2320 and a beverage-making state image have been changed based on the changed beverage-making step.

In addition, by using the beverage-making screen 2300 again updated as shown in FIG. 11C, the user may check that the beverage-making process, e.g., of making beer as a beverage, has currently progressed to a degree of 71%, an operation of generating carbon dioxide is being performed, the temperature in the fermentation tank is 44 degrees Fahrenheit, and the amount of the generated carbon dioxide is 8 g. The controller 2080 may display, on the beverage-making state window 2320, a beverage-making state image representing that carbon dioxide is currently being generated.

By comparing the beverage-making state window 2320 of FIG. 11B with the beverage-making state window 2320 of FIG. 11C, it can bee seen that, if the amount of carbon dioxide generated as the beverage-making processor of the beverage progresses is increased, the beverage-making state image is changed based on the increased amount of carbon dioxide. As such, the controller 2080 may provide a beverage-making state image that reflects not only schematic information on a current stage of the beverage-making process of a beverage but also a state of the beverage itself (e.g., an amount of carbon dioxide, etc.) that changes as the beverage-making process of the beverage progresses.

In some implementations, the controller 2080 may variously display the beverage-making state image displayed on the beverage-making state window 2320 according to characteristics of the beverage being made. For example, the controller 2080 may determine a color of the beverage being made based on ingredient information, and represent the determined color through the beverage-making state image.

Figure 12A:
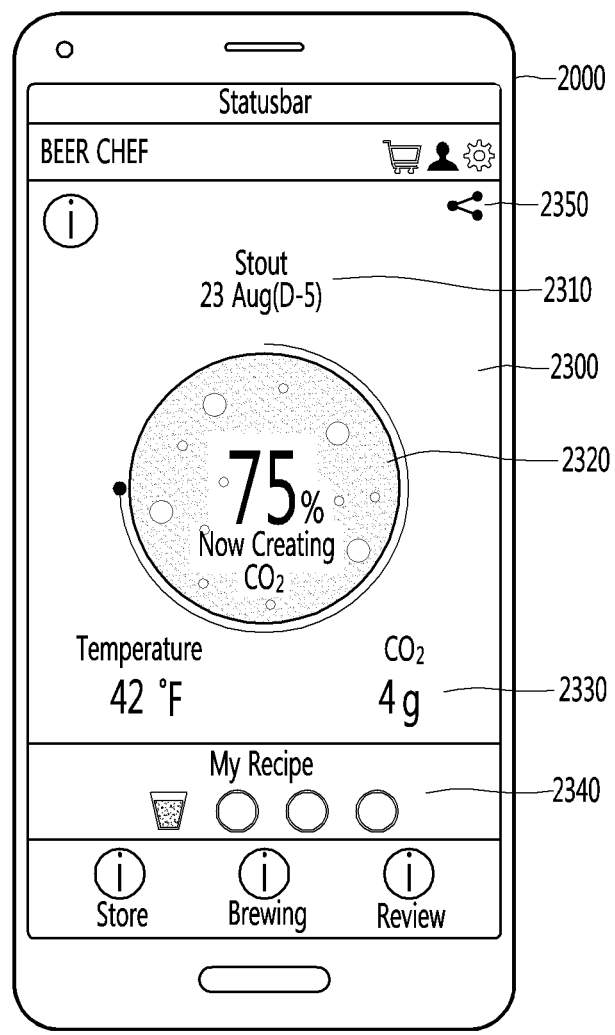
Figure 12B:
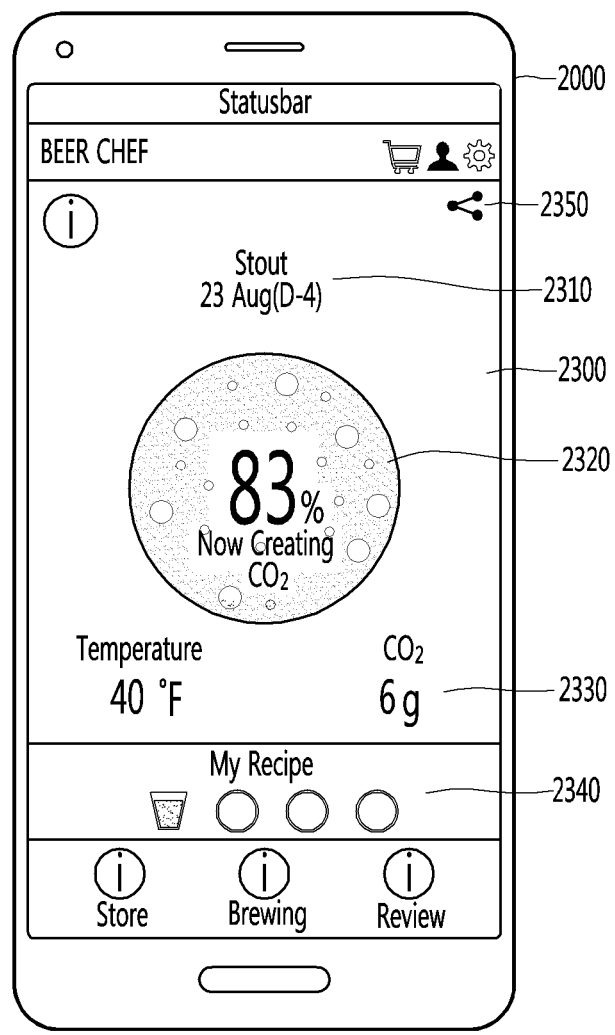

This will be described with reference to FIGS. 12A and 12B. When the beverage-making apparatus 1000 makes a beverage having a darker color than the beverage being made in the implementation of FIGS. 11A and 11C, the controller 2080 may display, on the beverage-making state window 2320, a beverage-making state image having a darker color than the beverage-making state image of FIGS. 11A to 11C.

In the example of making beer as a beverage, colors of beer may be different depending on kinds of wort (or malt). Pilsner, Pale ale, and Stout as kinds of wort will be described as examples. Beer brewed using Pilsner is defined to have a straw color, based on BJCP standard. Beer brewed using Pale ale may be defined to have an amber color, and may have a darker color than the beer brewed using Pilsner. Beer brewed using Stout is defined to have a black color, and have a darker color than the beer brewed using Pilsner and the beer brewed using Pale ale. That is, colors of beer may be different depending on kinds of wort.

As such, the mobile terminal 2000 may enable the user to conveniently check beverage-making information on a beverage being made by the beverage-making apparatus 1000 through the beverage making screen 2300 displayed on the display unit 2051. Particularly, the user can intuitively check a beverage-making state of beverage through the beverage-making state image displayed on the beverage-making screen 2300.

Figure 13:
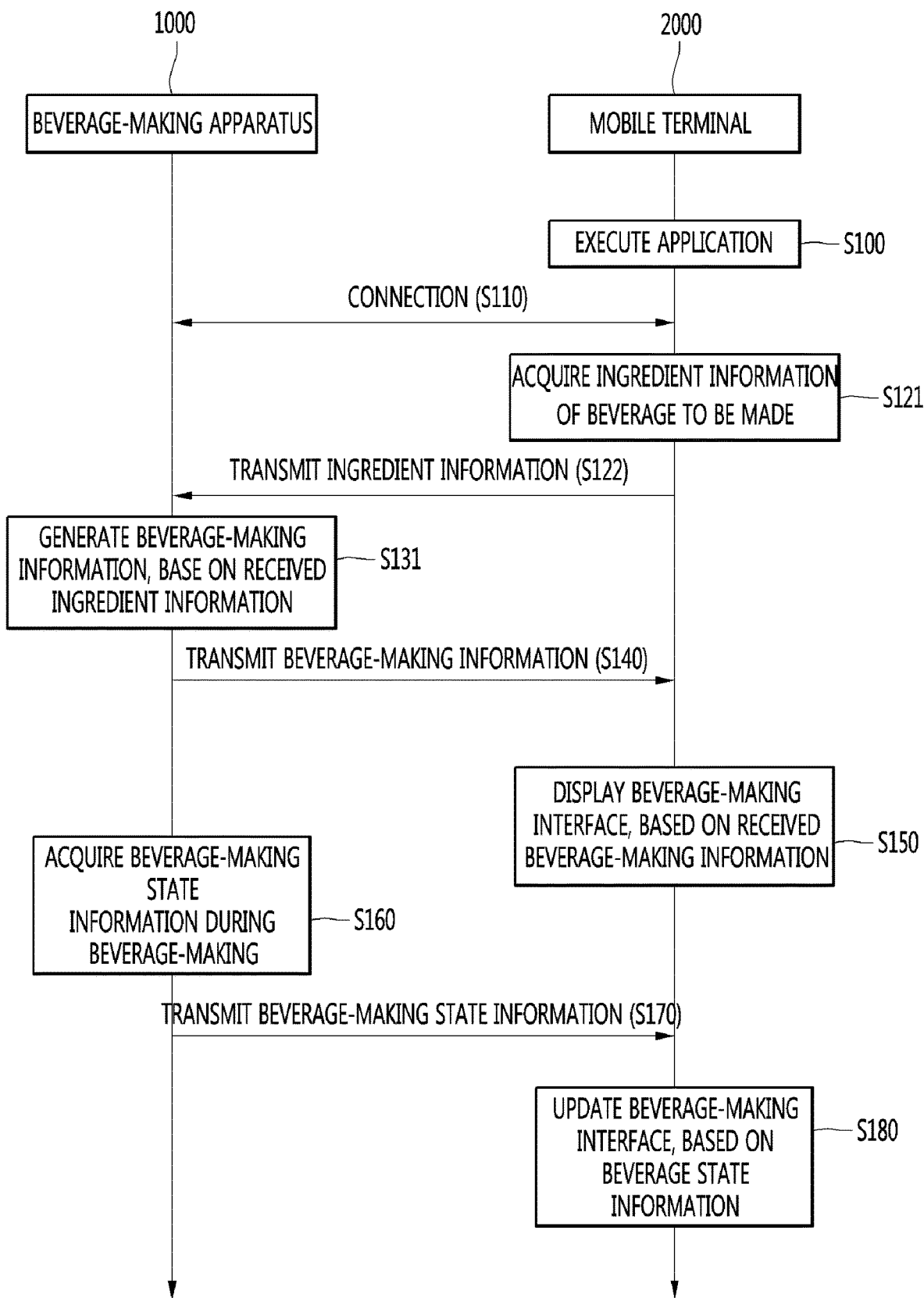
FIG. 13 is a diagram illustrating an example of a mobile terminal providing beverage-making information of a beverage-making apparatus according to another implementation.

FIG. 13 is a diagram illustrating an example of the mobile terminal 2000 providing beverage-making information of a beverage-making apparatus 1000 according to another implementation.

Referring to FIG. 13, unlike the implementation described in FIG. 7, ingredient information of the beverage to be made may be acquired through the mobile terminal 2000. This will be described with reference to steps S121, 122, and 131.

The mobile terminal 2000 may acquire ingredient information of beverage to be made using the beverage-making apparatus 1000 (S121). For example, the controller 2080 of the mobile terminal 2000 may display an ingredient selection screen for receiving, from the user, ingredient information of beverage to be made using the beverage-making apparatus 1000. The controller 2080 may receive information on at least one of beverage ingredients (e.g., in the scenario of making beer, ingredients such as wort, yeast, hops, and flavor additives) through the user input unit 2023, based on the ingredient selection screen.

In some implementations, the controller 2080 may receive ingredient information directly from the beverage ingredient pack 12 using the short-range communication module 2014 (e.g., the NFC communication module). For example, if the mobile terminal 2000 comes within a threshold distance to the beverage ingredient pack 12, such as a communication range of a communication device in the beverage-ingredient pack 12, the controller 2080 may receive the ingredient information through the short-range communication module 2014.

The mobile terminal 2000 may transmit the acquired ingredient information to the beverage-making apparatus 1000 (S122). The beverage-making apparatus 1000 may generate beverage-making information, based on the received ingredient information (S131). In some implementations, such beverage-making information may be substantially the same as the beverage brewing information described in FIG. 7.

In some implementations, the controller 2080 of the mobile terminal 2000 may autonomously generate beverage-making information, based on the acquired ingredient information.

As such, according to the implementation shown in FIG. 13, the ingredient information regarding the beverage to be made using the beverage-making apparatus 1000 may be acquired by the mobile terminal 2000.

Figure 14:
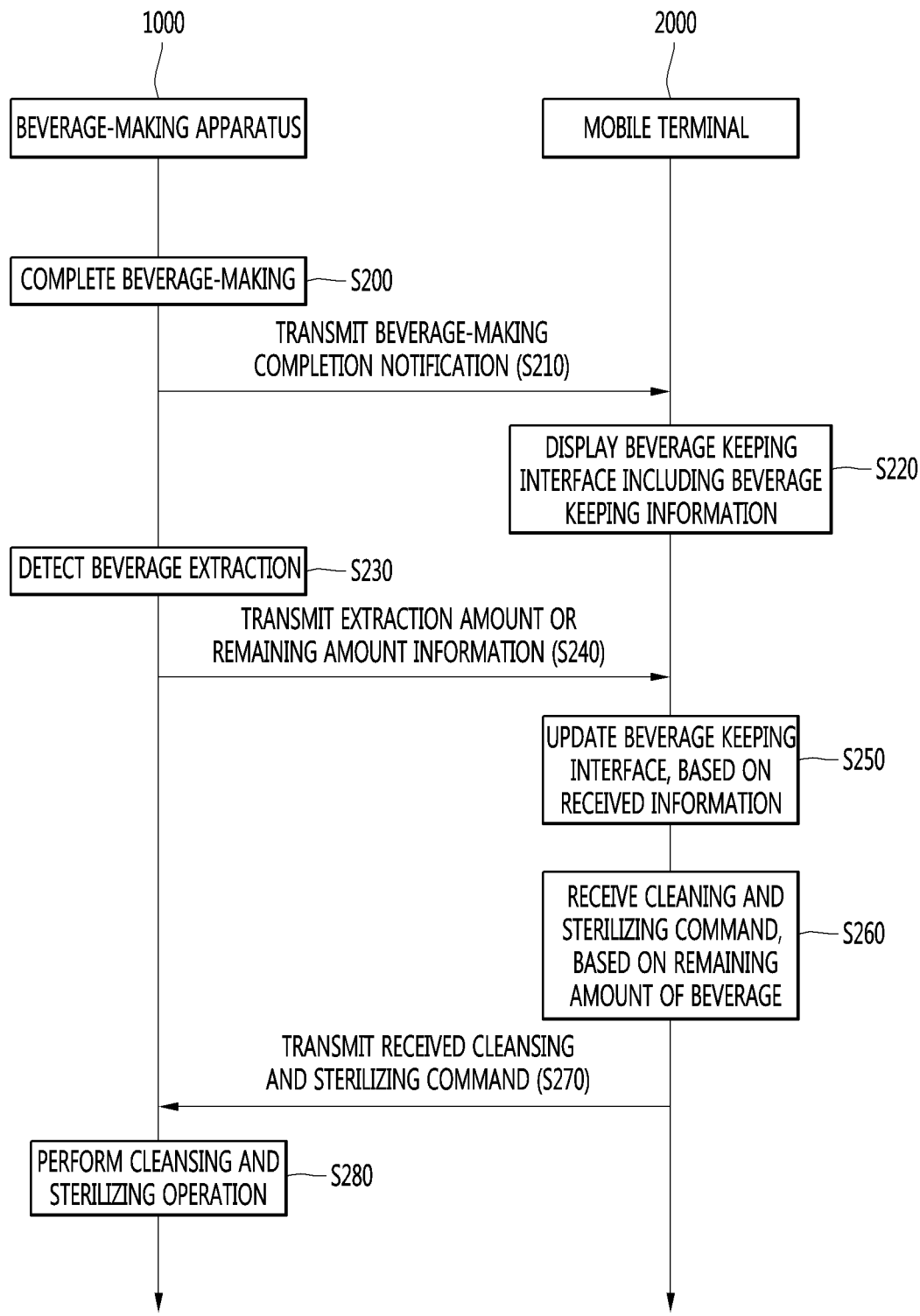
FIG. 14 is a diagram illustrating an example of a mobile terminal providing beverage-keeping information of a beverage-making apparatus according to an implementation.

FIG. 14 is a diagram illustrating an example of a mobile terminal 2000 providing beverage-keeping information of a beverage-making apparatus 1000 according to an implementation.

Referring to FIG. 14, when a beverage-making process of a beverage is completed (S200), the beverage-making apparatus 1000 may transmit, to the mobile terminal 2000, a beverage-making completion notification notifying that the beverage-making process of the beverage has been completed (S210).

In some implementations, the beverage-making completion notification may further include at least one of information on an amount of the beverage made, temperature information of the beverage, carbonic acid information, and the like.

In some implementations, the mobile terminal 2000 displays a beverage-keeping interface, based on the received beverage brewing completion notification (S220). The beverage-keeping interface may include information regarding the completed beverage that is being kept in the beverage-making apparatus 1000.

Such beverage-keeping information may include various information related to a state of the beverage being kept in the beverage-making apparatus 1000. For example, the beverage keeping information may include information regarding a drinkable time of the beverage, a remaining amount of the beverage, freshness degree information, temperature information, carbonic acid information, and the like. As described above, the carbonic amount information may refer to an amount of carbon dioxide contained in the beverage.

If extraction of the beverage being kept is detected (S230), the beverage-making apparatus 1000 may transmit extraction amount or remaining amount information of the beverage to the mobile terminal 2000 (S240). The mobile terminal 2000 may update the beverage-keeping interface, based on the received information (S250).

Analogous to what was described with reference to FIG. 1, when extraction of beverage being kept is detected, the beverage-making apparatus 1000 may use a variety of techniques to calculate the amount of beverage extracted and/or the amount of beverage remaining after extraction. For example, in some implementations, the controller 109 of the beverage-making apparatus 1000 may determine a total time of beverage extraction, e.g., by adding up at least one of a time required to turn on the micro switch included in the beverage extraction valve 62, a time required to drive the air pump 152, and a time required to turn on the main valve 9 after the beverage-making process of the beverage is completed. The micro switch may be point-contacted when the user manipulates the beverage extraction valve 62 in the direction in which the beverage extraction valve 62 is opened. In this case, since the beverage-making process of the beverage is completed, the controller 109 may open the main valve 9, and turn on the air control valve 156, thereby extracting the beverage.

In such scenarios, the controller 109 may calculate an extraction amount of the beverage, based on the added-up time. The controller 109 may transmit information on the calculated extraction amount to the mobile terminal 2000. In some implementations, the controller 109 may calculate a remaining amount of the beverage being kept, based on the calculated extraction amount, and transmit information on the calculated remaining amount to the mobile terminal 2000.

The controller 2080 of the mobile terminal 2000 may update the beverage-keeping screen, based on the received extraction amount information or remaining amount information.

Hereinafter, an implementation of the beverage-keeping interface displayed by the mobile terminal 2000 will be described with reference to FIGS. 15A to 15C.

Figure 15A:
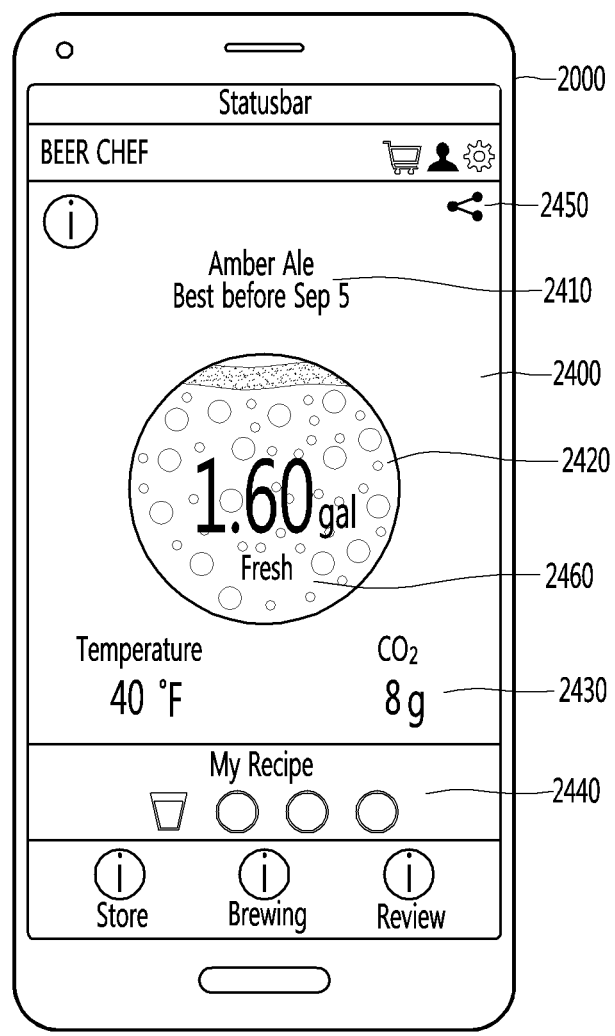
FIGS. 15A to 15C are diagrams illustrating examples of a beverage-keeping interface displayed through the mobile terminal.
Figure 15B:
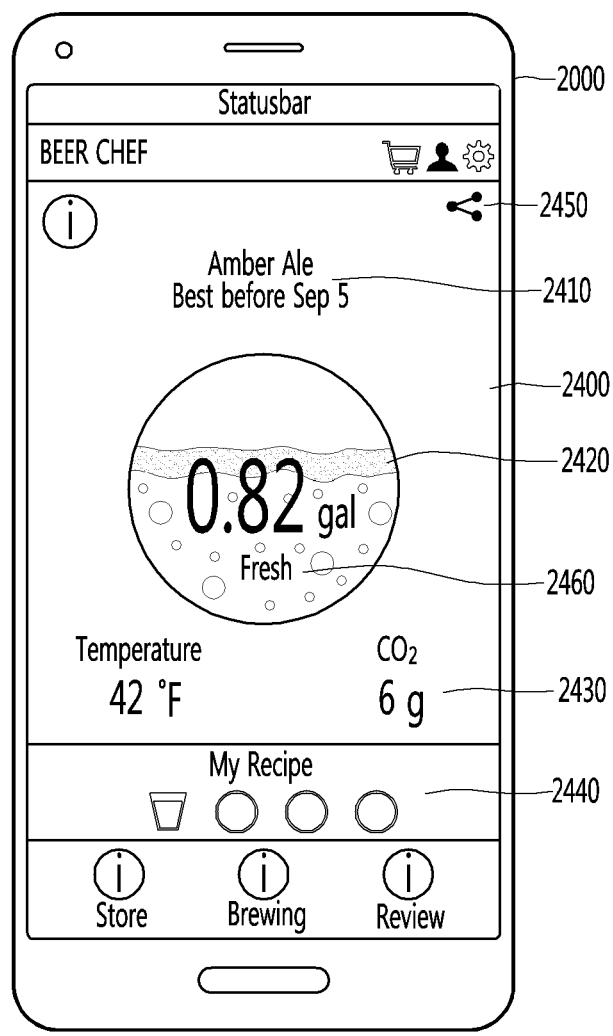
Figure 15C:
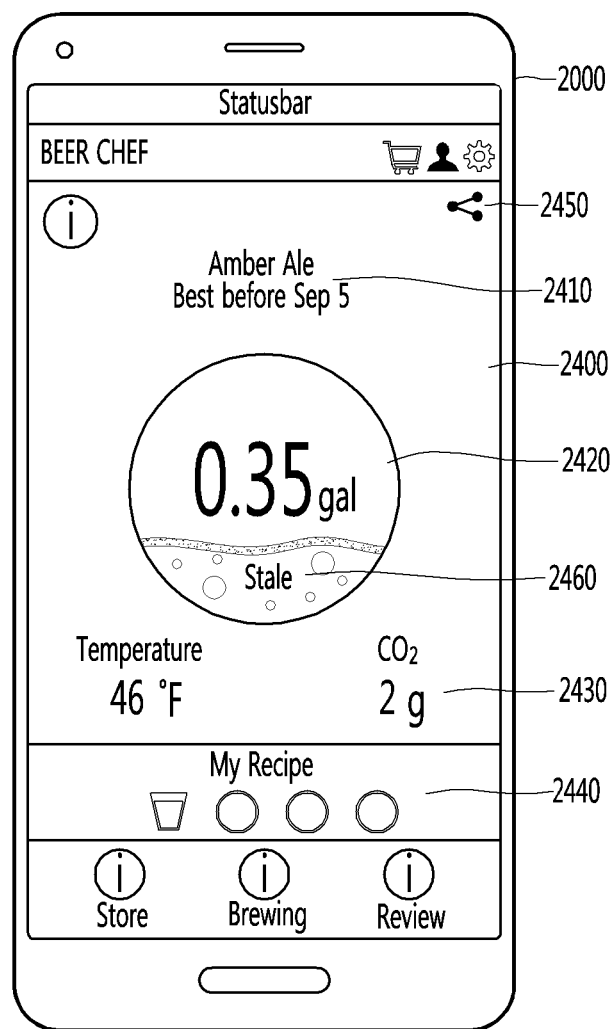

FIGS. 15A to 15C are diagrams illustrating examples of a beverage-keeping interface displayed through the mobile terminal 2000.

Referring to FIG. 15A, when the beverage-making process of the beverage-making apparatus 1000 is completed, the mobile terminal 2000 may receive a beverage-making completion notification from the beverage-making apparatus 1000. The mobile terminal 2000 may display a beverage-keeping interface 2400 through the display unit 2051, in response to the received beverage-making completion notification. For example, the beverage-making screen 2300 that was displayed during the beverage-making process may be changed to the beverage-keeping interface 2400.

The beverage-keeping interface 2400 may include information 2410 on a name of the beverage being made and then kept (or a name of a main ingredient, e.g., wort for beer-making) and a drinkable time, beverage state window (2420) representing a state of the beverage being kept, and information 2430 on a temperature and a carbonic acid amount (or an amount of carbon dioxide). In addition, the beverage keeping screen 2400 may include a recipe information window 2440 for registering a recipe of the beverage or displaying information of the recipe, a sharing icon 2450 for sharing information on the beverage being kept, and freshness degree information 2460 representing a freshness degree of the beverage being kept.

The drinkable time of the beverage being kept may be differently set depending on types of beverage (or types of ingredients). As such, the controller 109 of the beverage-making apparatus 1000 or the controller 2080 of the mobile terminal 2000 may set the drinkable time of the beverage, based on ingredient information acquired in the beverage-making process.

The beverage state window 2420 may represent information including a remaining amount of the beverage being kept and the freshness degree information 2460, e.g., using a number or text. The freshness degree information 2460 may be changed based on the information 2410 on the drinkable time. For example, when a current date is within the drinkable time, the controller 2080 may display the freshness degree information 2460 representing that the beverage being kept is fresh. On the other hand, when the current data exceeds the drinkable time, the controller 2080 may display the freshness degree information 2460 representing that the beverage being kept is stale. In addition, the beverage state window 2420 may further include a beverage state image for intuitively representing a state of the beverage being kept. The beverage state image may, for example, visually represent at least one of a remaining amount of the beverage being kept, a bubble amount of the beverage, a carbonic acid amount of the beverage, and a freshness degree of the beverage.

The temperature and carbonic acid amount information 2430 may include information on a temperature of the beverage being kept and an amount (e.g., a carbonic acid amount) of carbon dioxide contained in the beverage. For example, the controller 109 of the beverage-making apparatus 1000 may generate information on the temperature and carbonic acid amount of the beverage being kept using a pressure and a temperature, which are respectively sensed by the pressure sensor 72 and the temperature sensor 16.

In some implementations, the controller 2080 may provide, through the beverage-keeping interface 2400, a function of controlling the temperature of the beverage being kept in the beverage-making apparatus 1000. For example, the controller 2080 may receive an input for selecting temperature information displayed on the beverage-keeping screen 2400, and display an icon or popup window for controlling the temperature being kept, based on the received input. The controller 2080 may receive information on a control temperature of the beverage, based on the displayed icon or popup window. The controller 2080 may transmit, to the beverage-making apparatus 1000, a control signal corresponding to the received information. The controller 109 of the beverage-making apparatus 1000 may control the temperature of the beverage being kept, based on the receive control signal.

The recipe information window 2440 may include ingredient information of the beverage being kept. For example, in the scenarios of making beer, when the ingredient information acquired in the beverage brewing includes only wort information, the user may input the other ingredient information through recipe information window 2440.

In the examples of FIGS. 15A to 15C, when there is a change to the beverage-keeping information, such as a change in the remaining amount of the beverage being kept, the temperature of the beverage, the carbonic acid amount of the beverage, and/or the freshness degree of the beverage, the controller 2080 may update the beverage-keeping screen 2400, based on the changed beverage-keeping information.

For example, when the remaining amount of the beverage is changed from 1.6 gal to 0.82 gal and then 0.35 gal as the beverage is extracted, the controller 2080 may change the remaining amount of the beverage, displayed on the beverage state window 2420, and display the changed remaining amount of the beverage. In addition, the beverage state image displayed on the beverage state window 2420 may be changed and displayed to visually display that the remaining amount of the beverage being kept has been decreased.

Referring to FIGS. 15A to 15C, when there is a change in the temperature and/or carbonic acid amount of the beverage being kept in the beverage-making apparatus 1000, the controller 2080 may update the temperature and/or carbonic acid amount information 2430. In addition, the beverage state image displayed on the beverage state window 2420 may be changed and displayed to visually represent that the temperature and/or carbonic acid amount of the beverage has been changed.

In some implementations, referring to the freshness degree information 2460 of FIG. 15C, when the keeping time of the brewed beverage exceeds the drinkable time, the freshness degree of the beverage may be changed. In this case, the controller 2080 may change a freshness degree of the beverage, displayed through the freshness degree information 2460.

As such, the mobile terminal 2000 according to some implementations provides a beverage-keeping interface representing a state of beverage being kept in the beverage-making apparatus 1000, so that the user can conveniently check the state of the beverage being kept.

Referring again to FIG. 14, as the beverage kept in the beverage-making apparatus 1000 is extracted a plural number of times, the remaining amount of the beverage may be gradually decreased. The mobile terminal 2000 may receive a cleansing and sterilizing command for the beverage-making apparatus 100, based on the remaining amount of the beverage being kept in the beverage-making apparatus 1000 (S260).

Specifically, when the remaining amount of the beverage is smaller than a reference amount, the controller 2080 of the mobile terminal 2000 may display, on the beverage-keeping screen, a menu button for receiving the cleansing and sterilizing command from the user. The user may input the cleansing and sterilizing command, for example, by selecting the displayed menu button. The controller 2080 may receive the cleaning and sterilizing command as the menu button is selected.

As the received cleansing and sterilizing command is transmitted to the beverage-making apparatus 1000 (S270), the mobile terminal 2000 may control a cleansing and sterilizing operation of the beverage-making apparatus 1000 (S280).

Steps S260 to S280 will be described with reference to FIGS. 16A and 16B.

Figure 16A:
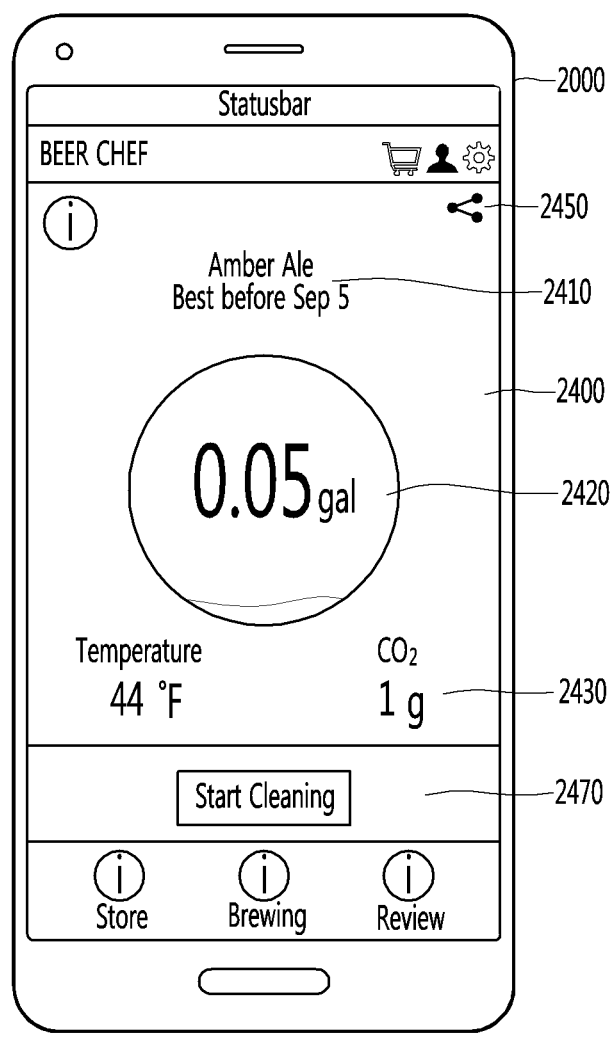
FIGS. 16A and 16B are diagrams illustrating examples of an interface displayed through the mobile terminal in a state in which a cleansing and sterilizing operation is performed in the beverage-making apparatus based on an amount of a beverage remaining.
Figure 16B:
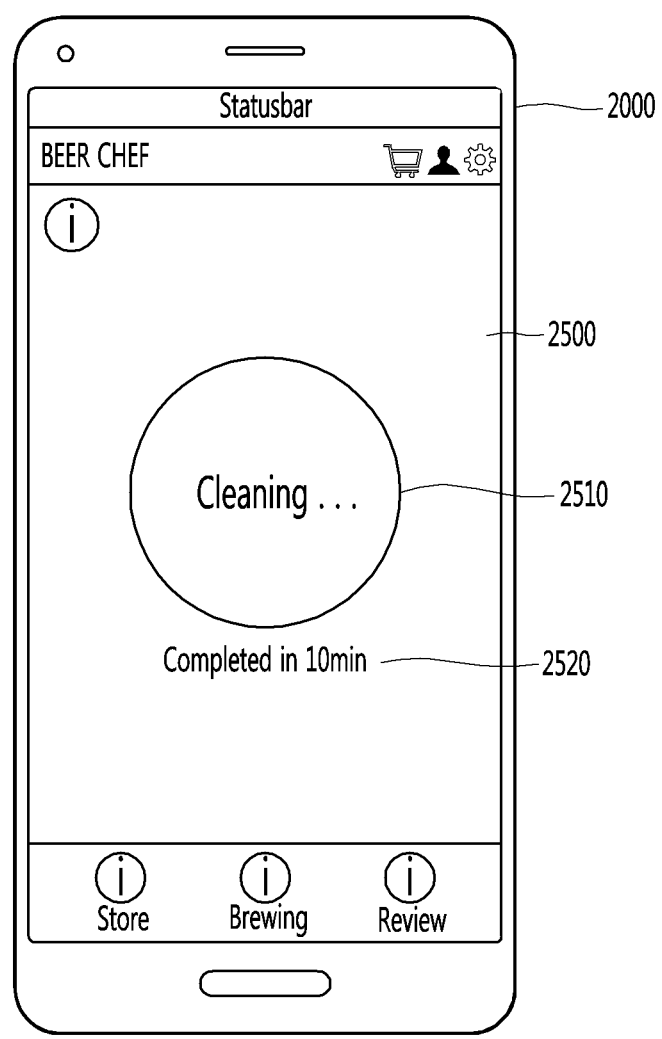

FIGS. 16A and 16B are diagrams illustrating examples of an interface displayed through the mobile terminal 2000 in a state in which a cleansing and sterilizing operation is performed in the beverage-making apparatus 1000 based on an amount of a beverage remaining.

Referring to FIG. 16A, as the beverage kept in the beverage-making apparatus is extracted plural times, the remaining amount of the beverage may be gradually decreased. The controller 2080 may display a menu button 2470 for controlling the cleansing and sterilizing operation of the beverage-making apparatus 1000, based on remaining amount information of the beverage. In FIG. 16A, it is illustrated that the menu button 2470 is included in the beverage-keeping screen 2400 to be displayed. However, the menu button 2470 may be displayed in various manners.

In some implementations, the menu button 2470 for controlling the cleansing and sterilizing operation may be displayed when the remaining amount of the beverage is smaller than the reference amount. For example, when the reference amount is 0.1 gal and the current remaining amount of the beverage is 0.05 gal, the controller 2080 may display the menu button 2470 through the display unit 2051.

Referring to FIG. 16B, the controller 2080 may receive the cleansing and sterilizing command by receiving an input for selecting the menu button 2470 through the user input unit 2023. The controller 2080 may transmit, to the beverage-making apparatus 1000, the received cleansing and sterilizing command or a command corresponding thereto. The controller 109 of the beverage-making apparatus 1000 may perform the cleansing and sterilizing operation in response to the received command.

As such, in some implementations, mobile terminal 2000 provides a menu button for performing a cleansing and sterilizing operation of the beverage-making apparatus 1000, based on a remaining amount of beverage kept in the beverage-making apparatus 1000. Thus, the user can conveniently receive information on a cleansing and sterilizing time of the beverage-making apparatus 1000, and simply control the cleansing and sterilizing operation.

The present disclosure described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet).

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

The processes and operations described herein, such as those that generate and operate the user interfaces, may be executed entirely by a user's mobile terminal (e.g., mobile terminal 2000) executing an installed application, or may be executed entirely by a server system that remotely hosts the application, or may be executed by any combination of user-side and server-side processing.

The foregoing implementations are merely exemplary and are not to be considered as limiting the present disclosure. This description is intended to be illustrative, and not to limit the scope of the claims. Many alternatives, modifications, and variations will be apparent to those skilled in the art. The features, structures, methods, and other characteristics of the exemplary implementations described herein may be combined in various ways to obtain additional and/or alternative exemplary implementations.

As the present features may be implemented in several forms without departing from the characteristics thereof, it should also be understood that the above-described implementations are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A beverage-making apparatus comprising:
    a fermentation tank having an inner space and an opening communicating with the inner space;
    a beverage brewing pack configured to be selectively accommodated in the inner space of the fermentation tank through the opening;
    a fermentation tank cover configured to open and close the opening of the fermentation tank; and
    an air injector configured to supply air to the beverage brewing pack,
    wherein the air injector includes
        air injection pump,
        an air injection flow path communicating the beverage brewing pack and the air injection pump, and
        an air filter that is installed before the air injection pump in an air injection direction to filter pollutants.

2. The beverage-making apparatus of claim 1, further comprising:
    a water supply module configured to supply water to the fermentation tank;
    a dispenser in which beverage ingredients are accommodated; and
    a water supply flow path configured to connect the water supply module and the dispenser,
    wherein the air injection flow path 81 is connected to the water supply flow path, and
    wherein the dispenser and the beverage brewing pack are connected to a main flow path.

3. The beverage-making apparatus of claim 2,
    wherein the air pumped from the air injection pump flows through the air injection flow path to the water supply flow path, and
    wherein the air flowing into the water supply flow path sequentially flows through the dispenser and the main flow path to the beverage brewing pack.

4. The beverage-making apparatus of claim 2, further comprising:
    a bypass flow path configured to be connected to the water supply flow path and the main flow path and through which water or air in the water supply flow path bypasses the dispenser to be guided to the main flow path.

5. The beverage-making apparatus of claim 4,
    wherein the air pumped from the air injection pump flows through the air injection flow path to the water supply flow path, and
    wherein the air flowing into the water supply flow path sequentially flows through the bypass flow path and the main flow path to the fermentation tank.

6. The beverage-making apparatus of claim 2,
    wherein the air injector further includes a check valve that prevents water in the water supply flow path from flowing through the air injection flow path.

7. The beverage-making apparatus of claim 6,
    wherein the check valve is disposed in the air injection flow path and installed after the air injection pump in the air injection direction.

8. The beverage-making apparatus of claim 4, further comprising:
    an opening/closing valve provided between a connecting part of the air injector and the dispenser in the water supply flow path; and
    a bypass valve configured to open and close the bypass flow path.

9. The beverage-making apparatus of claim 8, further comprising:
    a controller configured to control water supply and flowing of air,
    wherein, when water is supplied to the beverage brewing pack or when air is injected to the beverage brewing pack, the controller controls to open the bypass valve and controls to close the opening/closing valve.

10. The beverage-making apparatus of claim 8, further comprising:
    a controller configured to control water supply and flowing of air,
    wherein, when residual water in the dispenser is removed, the controller controls to open the opening/closing valve, controls to close the bypass valve, and turns on the air injection pump.

11. The beverage-making apparatus of claim 8, further comprising:
    a controller configured to control water supply and flowing of air,
    wherein, when the ingredients accommodated in the dispenser are extracted, the controller controls to open the opening/closing valve and controls to close the bypass valve.

* * * * *